United States Patent
Stoicescu et al.

(10) Patent No.: US 9,546,625 B2
(45) Date of Patent: Jan. 17, 2017

(54) VOLUTE FOR ENGINE-MOUNTED BOOST STAGE FUEL PUMP

(71) Applicant: Hamilton Sundstrand Corporation, Charlotte, NC (US)

(72) Inventors: Adrian L. Stoicescu, Roscoe, IL (US); Brandon T. Kovach, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 312 days.

(21) Appl. No.: 14/507,388

(22) Filed: Oct. 6, 2014

(65) Prior Publication Data

US 2016/0097399 A1   Apr. 7, 2016

(51) Int. Cl.
| | |
|---|---|
| *F04D 29/44* | (2006.01) |
| *F02M 37/18* | (2006.01) |
| *F04D 29/42* | (2006.01) |
| *F04D 29/22* | (2006.01) |
| *F04D 31/00* | (2006.01) |

(52) U.S. Cl.
CPC .......... *F02M 37/18* (2013.01); *F04D 29/2277* (2013.01); *F04D 29/4293* (2013.01); *F04D 29/445* (2013.01); *F04D 31/00* (2013.01); *F05D 2250/52* (2013.01); *F05D 2250/74* (2013.01)

(58) Field of Classification Search
CPC ...... F02M 37/18; F04D 31/00; F04D 29/4293; F04D 29/2277; F04D 29/445; F05D 2250/74; F05D 2250/52
See application file for complete search history.

(56) References Cited

U.S. PATENT DOCUMENTS

| | | | | |
|---|---|---|---|---|
| 7,334,986 | B2* | 2/2008 | Sohn | F04D 29/422 415/204 |
| 8,944,767 | B2* | 2/2015 | Stoicescu | F04D 29/2277 416/175 |
| 8,974,178 | B2* | 3/2015 | Stoicescu | F04D 29/426 415/204 |
| 2005/0281669 | A1* | 12/2005 | Sohn | F04D 29/422 415/204 |
| 2013/0183148 | A1* | 7/2013 | Stoicescu | F04D 29/426 415/203 |
| 2013/0183155 | A1* | 7/2013 | Stoicescu | F04D 29/2277 416/175 |

* cited by examiner

*Primary Examiner* — Igor Kershteyn
*Assistant Examiner* — Eldon Brockman
(74) *Attorney, Agent, or Firm* — Kinney & Lange, P.A.

(57) ABSTRACT

A housing has walls that define a volute passage and a diffuser passage fluidly connected to the volute passage. The volute passage has a first subsection and a second subsection, each having cross-sectional areas defined by tabular data. A centrifugal pump has a rotor and a housing, the housing having walls defining a volute passage and a diffuser passage fluidly connected to the volute passage. The volute passage has a first subsection and a second subsection, each having cross-sectional areas defined by tabular data.

14 Claims, 12 Drawing Sheets

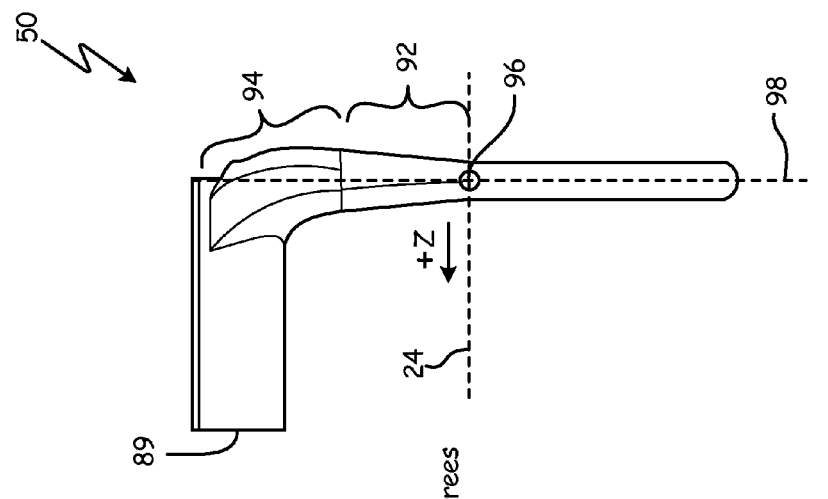
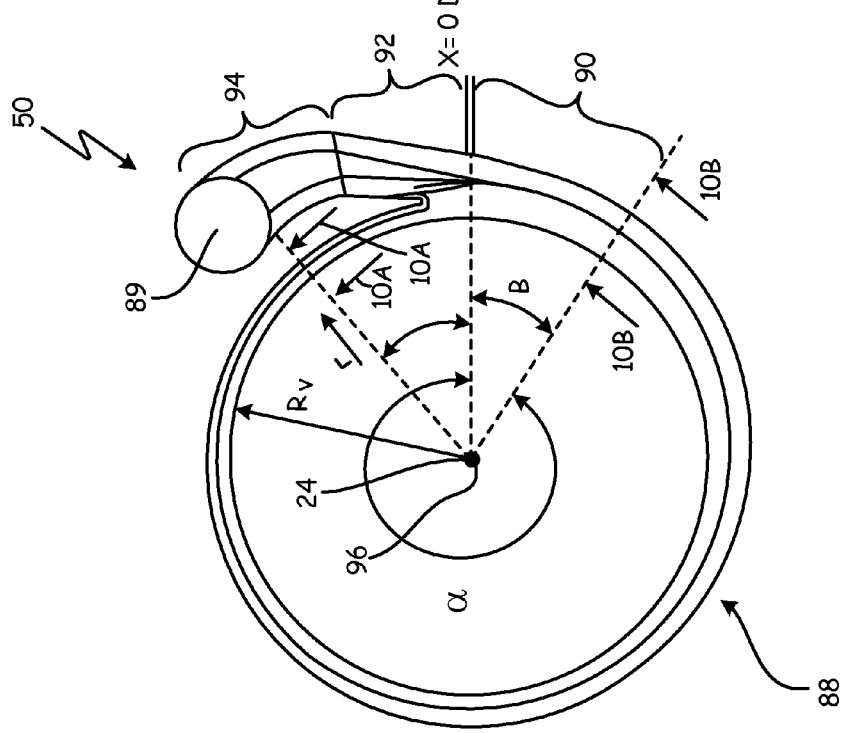
Fig. 9B
Fig. 9A

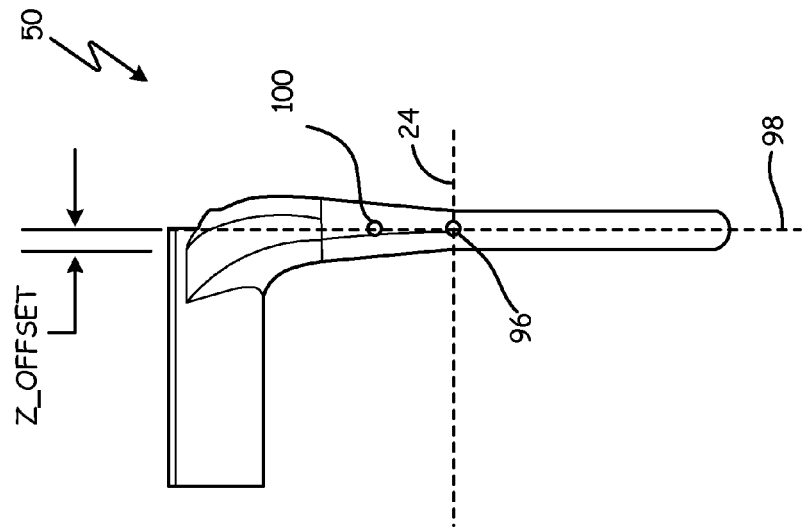
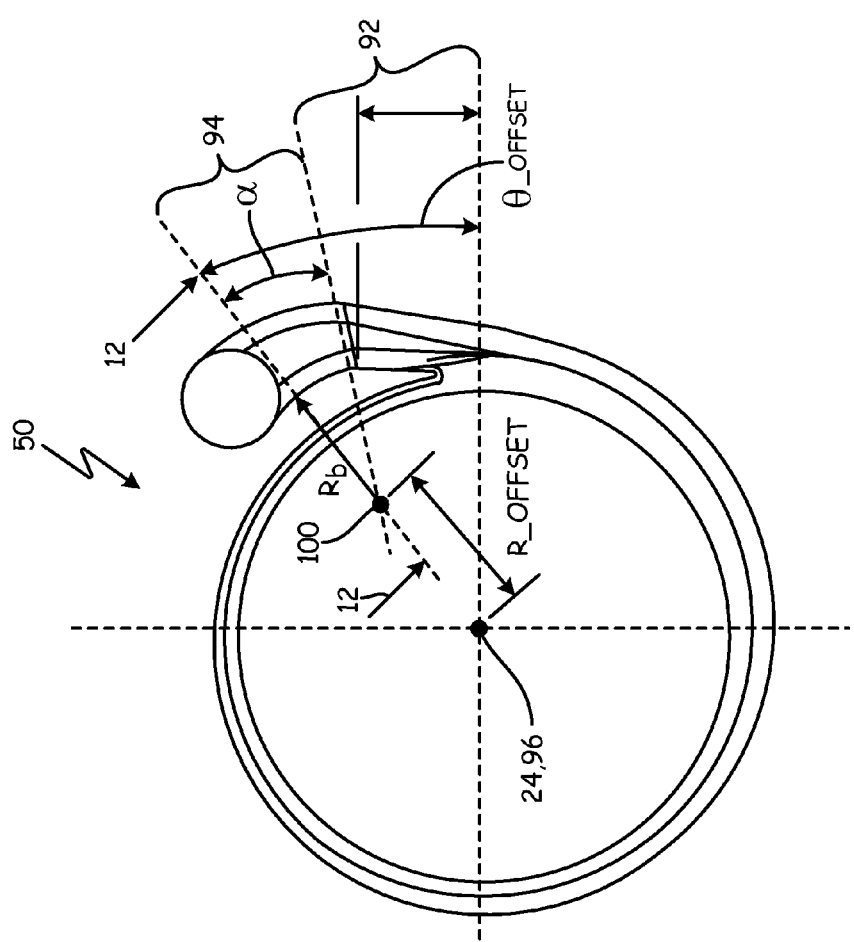
Fig. 11A
Fig. 11B

VOLUTE FOR ENGINE-MOUNTED BOOST STAGE FUEL PUMP

CROSS-REFERENCE TO RELATED APPLICATION(S)

Reference is made to application Ser. No. 14/507,406 entitled "Impeller for Engine-mounted Boost Stage Fuel Pump", which was filed on even date and is assigned to the same assignee as this application.

BACKGROUND

The present invention relates generally to centrifugal pumps and, more particularly, to a centrifugal fuel pump mounted to an aircraft engine.

The fuel delivery system of an aircraft supplies fuel to aircraft engines and typically includes a boost pump mounted to the engine. The boost pump receives fuel from fuel tanks mounted on the aircraft and supplies fuel to the main frame pump mounted to the aircraft frame.

The boost pump impeller, imparting increased pressure and flow rate to the fuel, and the volute collector, guiding fuel from the impeller to the boost pump outlet, are among the principle contributors to boost pump performance. Fuel flowing through pumps has potential energy, generally characterized by static pressure, and kinetic energy, generally characterized by dynamic pressure. The sum of the static and dynamic pressures defines a total pressure of the fuel. Efficient pump impellers impart tangential velocity, and therefore dynamic pressure, to the fuel exiting the impeller with minimal input power. The volute collector reduces the velocity and thereby coverts dynamic pressure into static pressure, a process sometimes referred to as pressure recovery. The combination of impeller and volute collector geometry govern pump performance.

Fuel boost pumps are designed to provide an uninterrupted supply of fuel to the main frame pump within a particular pressure and flow rate envelope under all operating conditions encountered by the fuel delivery system during an aircraft flight. Under normal in-flight operating conditions, the fuel tank pressure decreases as altitude increases following the natural depression in the ambient atmospheric pressure, and the fuel temperature varies between −40° F. and 300° F. Under abnormal conditions, the main frame pump can fail or the boost pump can become partially obstructed. Under each set of conditions, the boost pump delivers 100% liquid fuel when a ratio of fuel vapor to liquid fuel (V/L) at the boost pump inlet is 0.45 or more. Furthermore, boost pumps are designed to deliver a maximum outlet pressure such that heat exchangers, filters, and other downstream components do not fail under the boost pump pressure. Maintaining the operational envelope and overall efficiency of the boost pump in view of all the operational conditions during an aircraft flight sometimes involves multiple pumps, each pump tailored for a subset of the operating conditions encountered during flight. However, multiple pumps increase the weight and complexity of the fuel delivery system.

Reducing the weight and complexity of fuel delivery systems while increasing component performance and efficiency continues to be a goal of designers and manufacturers. Therefore a need exists for a high-performance, efficient boost pump that can deliver fuel to the main frame pump within an operational envelope for all conditions during an aircraft flight.

SUMMARY

A housing has walls that define a volute passage and a diffuser passage fluidly connected to the volute passage. The volute passage has a first subsection and a second subsection, each having cross-sectional areas defined by tabular data.

A centrifugal pump has a rotor and a housing. The housing has walls that define a volute passage and a diffuser passage fluidly connected to the volute passage. The volute passage has a first subsection and a second subsection, each having cross-sectional areas defined by tabular data.

BRIEF DESCRIPTION OF THE DRAWINGS

FIG. 9A is a plan view of the volute collector fluid volume of FIG. 8 that defines the frame of reference for first and second volute passages.

FIG. 9B is a side view of the volute collector fluid volume of FIG. 8 that defines the frame of reference for first and second volute passages.

FIG. 11A is a plan view of the volute collector in FIG. 8 that defines the frame of reference for a diffuser passage and an exit bend.

FIG. 11B is a side view of the volute collector in FIG. 8 that defines the frame of reference for a diffuser passage and an exit bend.

DETAILED DESCRIPTION

Figure 1:
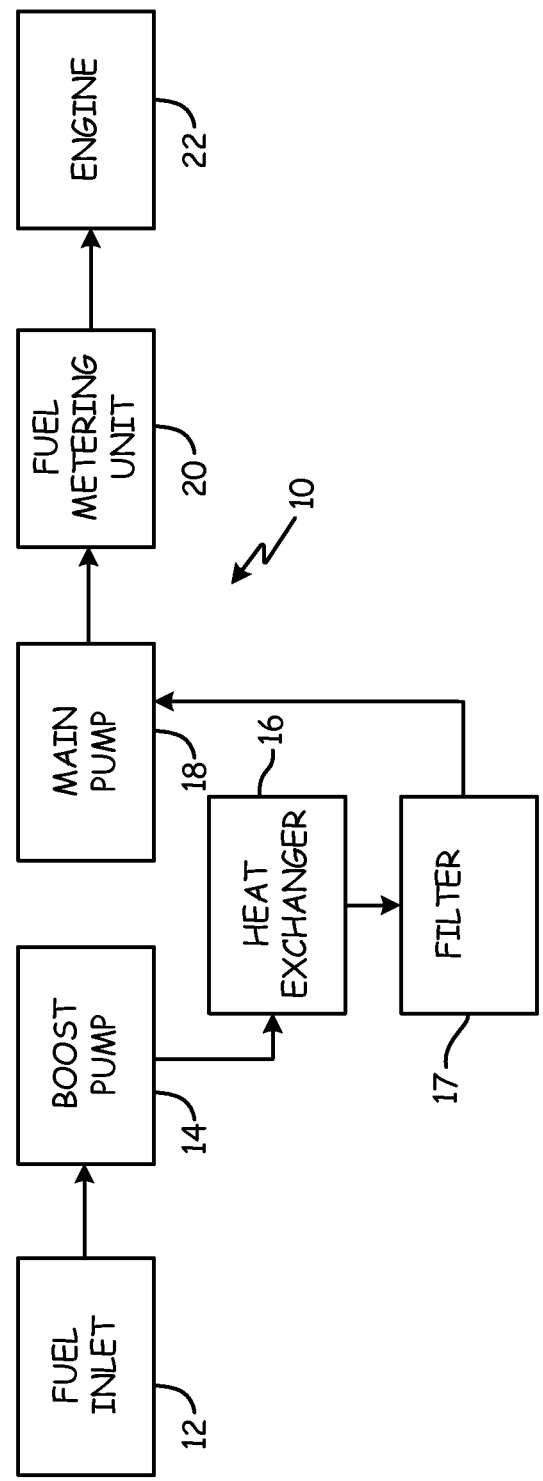
FIG. 1 is a schematic of a fuel delivery system.

FIG. 1 is a schematic of fuel delivery system 10 of an aircraft. System 10 includes fuel inlet 12, boost pump 14, heat exchanger 16, filter 17, main pump 18, fuel metering unit 20, and gas turbine engine 22. Fuel inlet 12 is fluidly connected to aircraft fuel tanks installed within the aircraft. Fuel is delivered from the fuel tanks through plumbing to fuel inlet 12, which supplies boost pump 14 with fuel. Boost pump 14 pressurizes the fuel before providing the fuel to heat exchanger 16 and filter 17. Heat exchanger 16 heats or cools the fuel, and filter 17 removes contaminants from the fuel before it enters main pump 18. Main pump 18 supplies fuel flow to fuel metering unit 20, which regulates the fuel supplied to engine 22. Engine 22 combusts the fuel, generating electrical and mechanical power for operating the aircraft.

Figure 2:
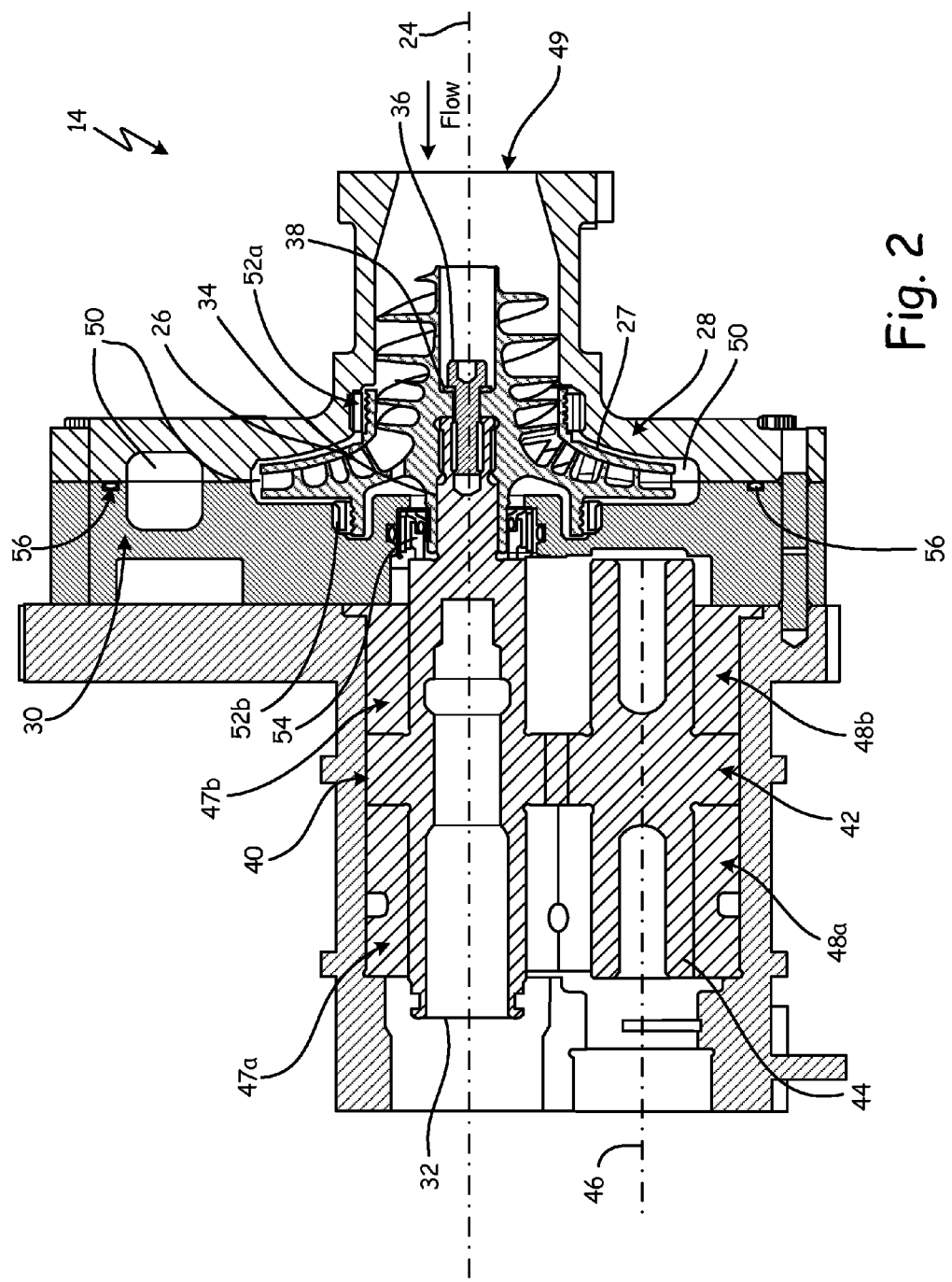
FIG. 2 is a cross-sectional view of a boost pump from the fuel delivery system in FIG. 1.

FIG. 2 is a cross-sectional view of boost pump 14 having a pump axis 24. Boost pump 14 includes impeller 26 having shroud 27 that is rotatable about pump axis 24 and enclosed within housing 28 and center plate 30. Shaft 32 supports impeller 26 at pilot fit 34, and fastener 36, aided by washer 38, affixes impeller 26 to shaft 32. Shaft 32 has spline 40 that engages drive gear 42, which is affixed to engine shaft 44. Engine shaft 44 is rotatable about axis 46, which is offset from pump axis 24, and is driven by a component of engine 22. Bearings 47a and 47b radially support shaft 32 while bearings 48a and 48b radially support engine shaft 44 with respect to engine 22 (not shown in FIG. 2).

Fuel enters boost pump 14 at inlet 49. Impeller 26 pressurizes the fuel and delivers it to volute collector 50. Labyrinth seal 52a minimizes fuel leakage between impeller 26 and housing 28 while labyrinth seal 52b performs the same function between impeller 26 and center plate 30. Face seal 54 contains the fuel within housing 28 and center plate 30 by preventing fuel flow between impeller 26, center plate 30, and shaft 32. Seal 56 further contains the fuel within housing 28 and center plate 30 by preventing fuel flow therebetween.

Figure 3:
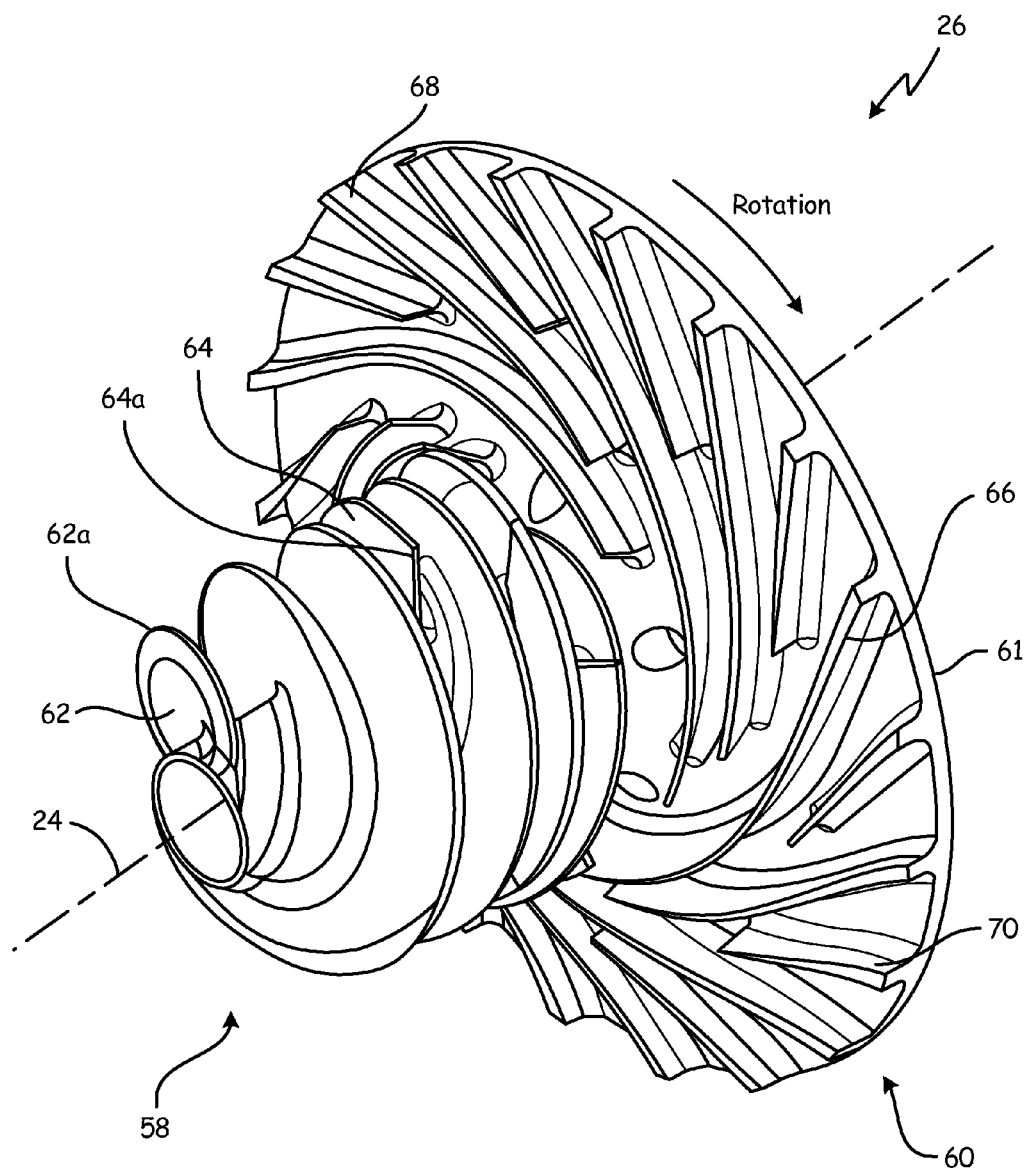
FIG. 3 is a perspective view of a shrouded impeller shown without the shroud.

FIG. 3 is a perspective view of impeller 26 shown without shroud 27 to illustrate the blade geometry of impeller 26. Impeller 26 includes inducer section 58 and impeller section 60, each being joined to hub 61. Hub 61 extends axially along axis 24 to support inducer section 58 and radially to support impeller section 60. Impeller 26 rotates about pump axis 24 in a clockwise direction as shown in FIG. 3.

Inducer section 58 includes primary blades 62 and secondary blades 64 having leading edges 62a and 64a, respectively. Leading edges 62a and 64a form tapers at the edges of primary and secondary blades 62 and 64, respectively, to facilitate fuel ingestion into inducer section 58. Primary blades 62 and secondary blades 64 are oriented to progressively drive fluid in an axial direction with respect to pump axis 24 such that the fuel pressure gradually increases as it traverses inducer section 58 towards impeller section 60. Inducer section 58 contains a two-phase mixture of fuel, a portion of the fuel being vapor and a portion of the fuel being liquid. The ratio of fuel vapor to liquid fuel (V/L) can be equal to or greater than 0.45 when it enters inducer section 58 that has a larger volume near its inlet to accommodate the two phase mixture. Near the outlet of inducer section 58, the fuel is completely compressed into a liquid state.

Impeller section 60 has main blades 66, primary splitter blades 68, and secondary splitter blades 70. Blades 66, 68, and 70 work by engaging the incoming flow from inducer section 58 at leading edges of blades 66, 68, and 70, each blade forming an incidence angle between the leading edge portion of the blade and the incoming flow direction of fuel. Blades 66, 68, and 70 guide the fuel through impeller section 60, the blade geometries being selected such that the fuel remains attached to the impeller surfaces and that no eddies are produced in the fuel. Main blades 66 extend radially outward with respect to pump axis 24 in a generally spiral shape between an inlet and an outlet of impeller section 60. As the fuel traverses impeller section 60, the cross-sectional area between main blades 66 increases. Primary splitter blades 68 and secondary splitter blades 70 are introduced to tailor the cross-sectional area profile between main blades 66 to efficiently impart mechanical energy to the fuel.

Figure 4:
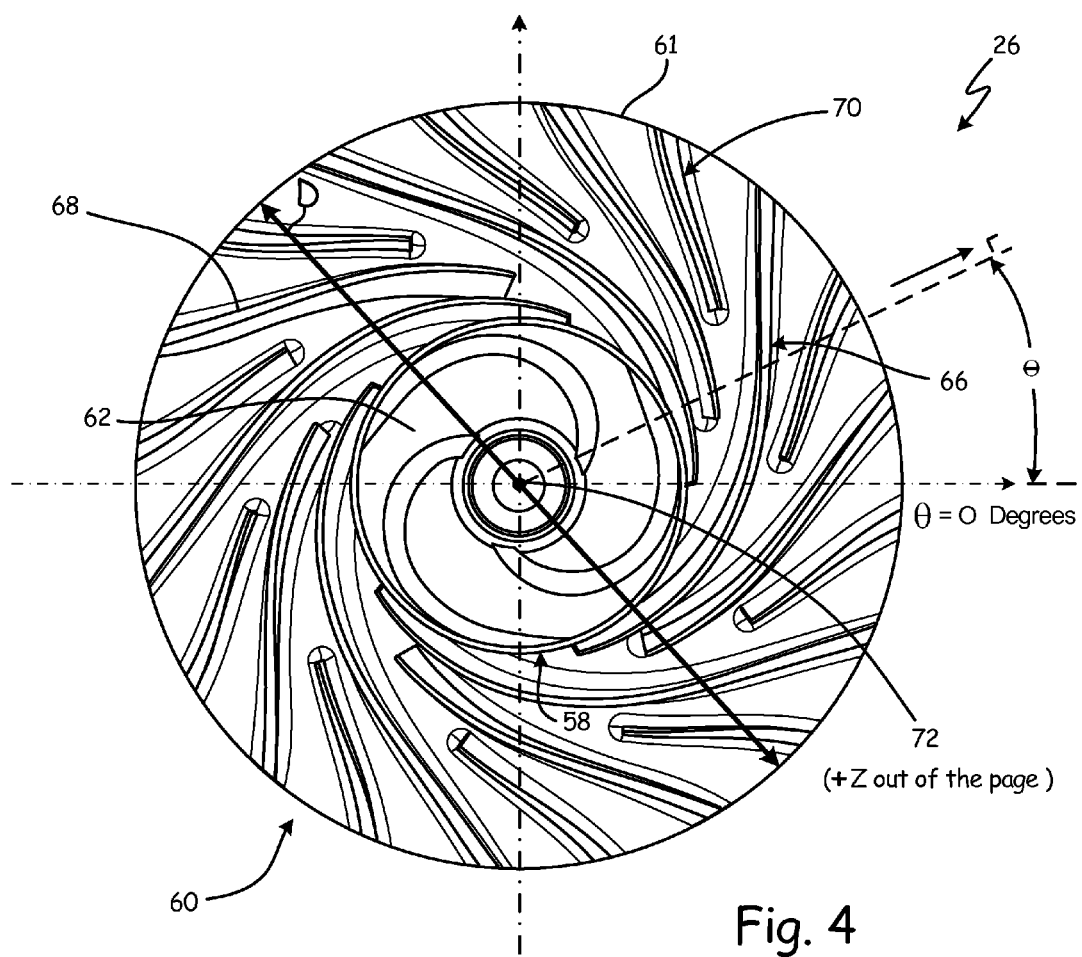
FIG. 4 is a plan view of the shrouded impeller of FIG. 3.

FIG. 4 is a plan view of impeller 26 shown without shroud 27 having outer impeller diameter D. In some embodiments, outer impeller diameter D is greater than or equal to 4.000 inches and less than or equal to 4.250 inches. Preferably, the outer impeller diameter D is 4.125 inches. The geometry of blades 62, 64, 66, 68, and 70 are defined with respect to origin 72 located at the intersection of hub 61 and pump axis 24. Origin 72 includes axial coordinate z, which has a positive direction oriented along pump axis 24 towards inducer section 58. Origin 72 further includes radial direction r and angular direction θ. Radial direction r is perpendicular to pump axis 24 while angular direction θ ranges between 0 degrees and 360 degrees, 0 degrees being located as shown in FIG. 4 and increasing in a counterclockwise direction about pump axis 24. Blades 62, 64, 66, 68, and 70 are defined by a series of cross-sections, as will be explained below.

Alternatively, blades 62, 64, 66, 68, and 70 can be defined with respect to a Cartesian coordinate system that is analogous to the cylindrical coordinate system defined by origin 72. Such a coordinate system has an origin that is collocated with origin 72 in which an x-axis extends radially at θ equal to 0 degrees, a y-axis extends radially at θ equal to 90 degrees, and a z-axis extends axially along axis 24.

Figure 5:
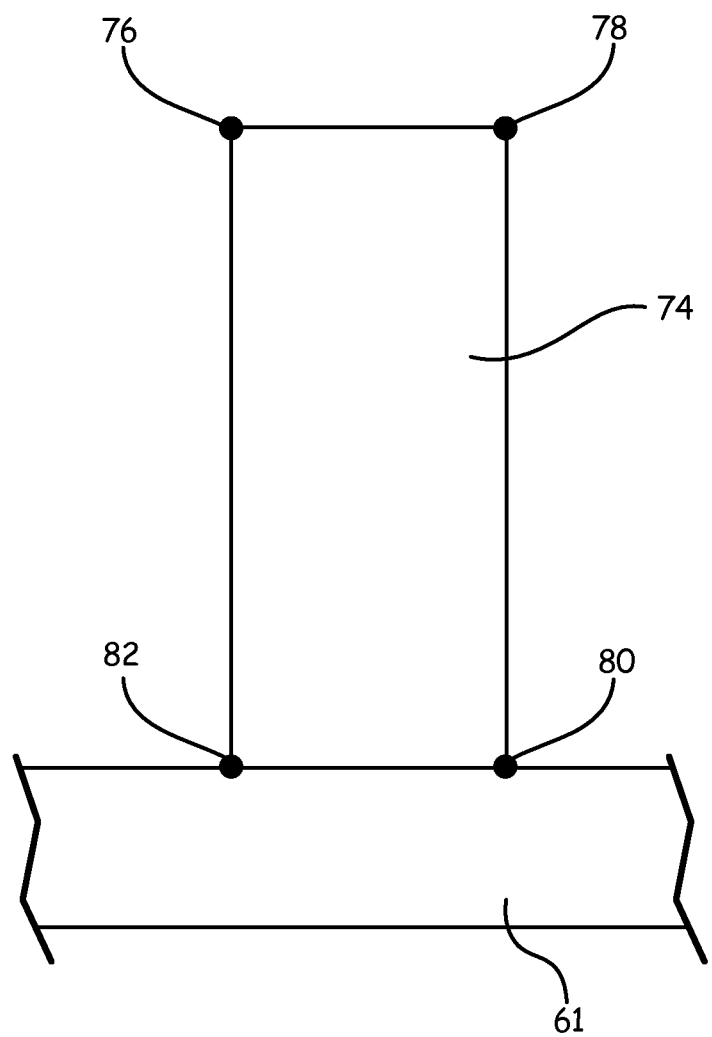
FIG. 5 is a cross-sectional view of an impeller blade cross-section.

FIG. 5 is a cross-sectional view of representative blade cross-section 74 of impeller 26 in relation to hub 61. Blade cross-section 74 has a generally rectangular cross-section defined by vertices 76, 78, 80, and 82. Blade cross-section 74 can represent primary blades 62, secondary blades 64, main blades 66, primary splitter blades 68, or secondary splitter blades 70. The location of vertices 76, 78, 80, and 82 are defined with respect to origin 72 and outer impeller diameter D, being presented as ratio r/D, ratio z/D, and θ. In some embodiments, vertices 76, 78, 80, and 82 are defined by Tables 1-5. Tables 1 and 2 define primary blades 62 and secondary blades 64, respectively, of inducer section 58, while Tables 3-5 define main blades 66, primary splitter blades 68, and secondary splitter blades 70, respectively, of impeller section 60. The geometry defined by Tables 1-5 are listed to the nearest ten-thousandth of an inch and to the nearest hundredth of a degree. However, all blades having a geometry within +/−0.010 inches and +/−0.005 degrees of Tables 1-5 are within the design tolerances of impeller 26. Moreover, blades 66, 68, and 70 can be machined flush with outer impeller diameter D, effectively trimming cross-section 40 from Tables 3-5, 11-13, and 19-21.

Figure 6:
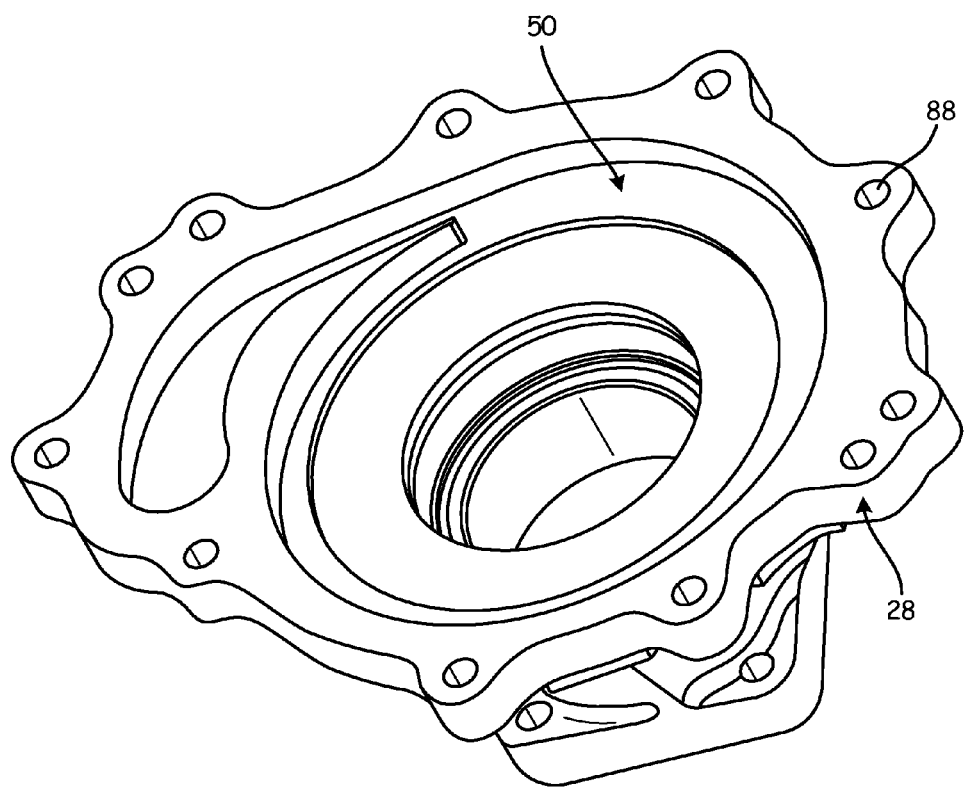
FIG. 6 is a perspective view of a boost pump housing showing a first portion of a volute collector.
Figure 7:
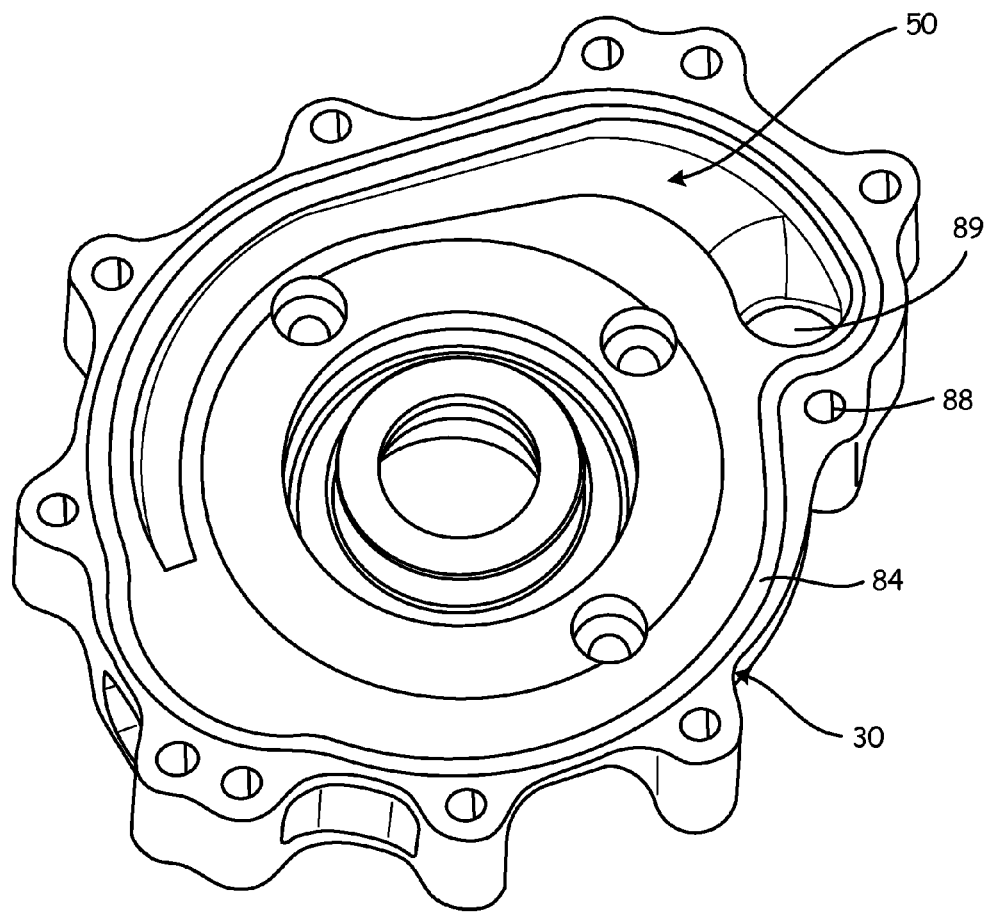
FIG. 7 is a perspective view of a boost pump center plate showing a second portion of a volute collector.

FIGS. 6 and 7 are perspective views of housing 28 and center plate 30, each showing volute collector portions 50a and 50b, respectively. When seal 56 (see FIG. 1) is assembled in groove 84 (see FIG. 7) and fasteners 86 (not shown) are installed through holes 88, housing 28 and center plate 30 are placed in a facing relationship. Volute collector portions 50a and 50b cooperate to form volute collector 50 (see FIG. 2). Volute collector 50 (see FIG. 2) is a passage that redirects fuel exiting impeller 26 towards boost pump outlet 89 defined by housing 28 and center plate 30.

Figure 8:
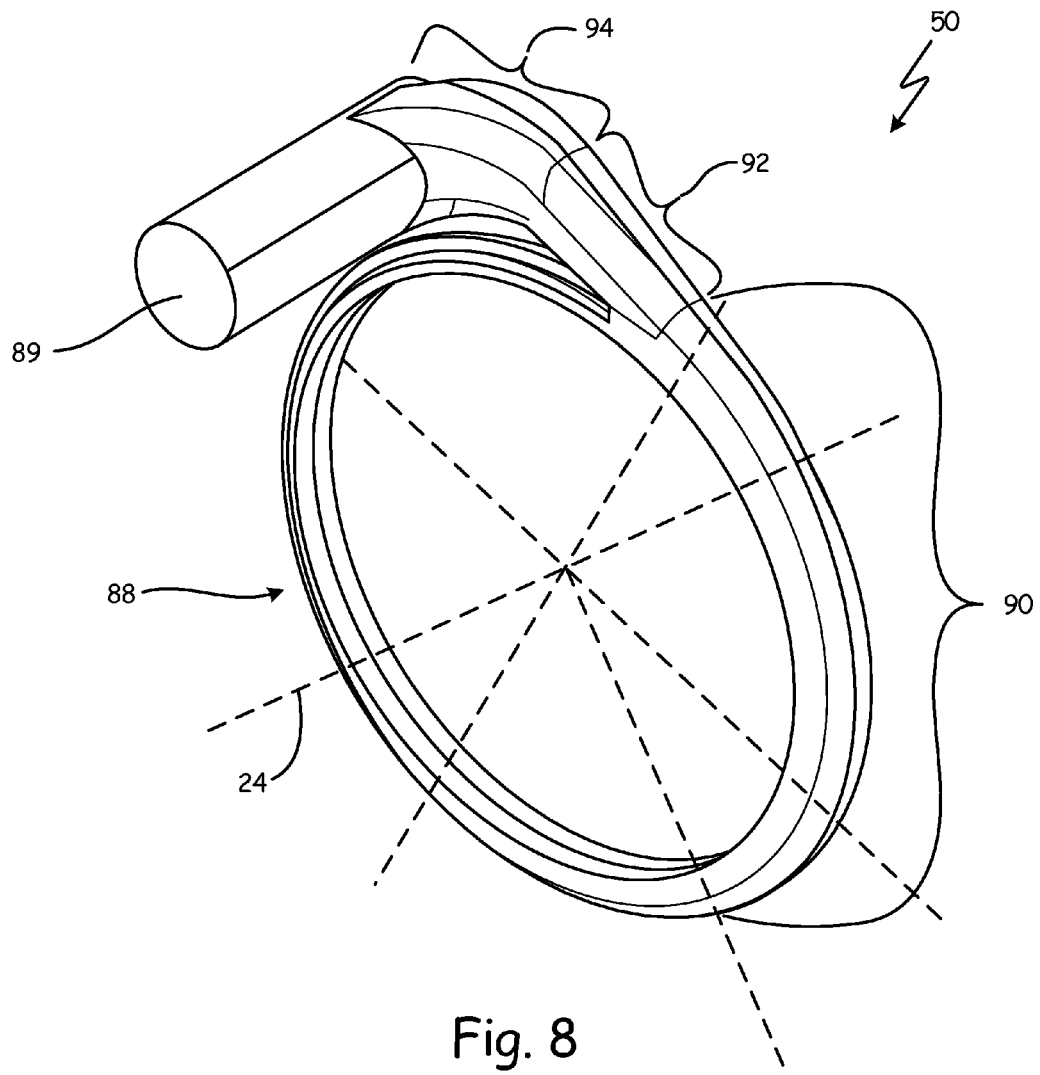
FIG. 8 is a perspective view of a volute collector fluid volume.

FIG. 8 is a perspective view of volute collector 50 shown as a volume for clarity. Volute collector 50 includes first volute passage 88, second volute passage 90, diffuser passage 92, and exit bend 94. First volute passage 88 and second volute passage 90 are sometimes referred to as the volute proper. The fuel exiting impeller 26 has velocity directed substantially in a tangential direction with respect to pump axis 24. First and second volute passages 88 and 90 collect the fuel flow, guiding it towards diffuser passage 92 with an increasing cross-section to reduce the fuel velocity. The cross-section of diffuser passage 92 expands further, such that at the exit of diffuser passage 92, the fuel has a dynamic and static pressure suitable for fuel delivery system 10 (see FIG. 1). Exit bend 94 directs the fuel in a direction necessary to interface with fuel delivery system 10. In some embodiments the combination of first and second volute passages 88 and 90 reduce the fuel velocity between 40% and 60% of the fuel velocity exiting impeller 26 (see FIGS.

2-5), and diffuser section 92 reduces the fuel velocity to between 25% and 50% of the fuel velocity exiting impeller 26. Furthermore, exit bend 94 can be greater than or equal to 70 degrees and less than or equal to 90 degrees.

FIG. 9A is a plan view and FIG. 9B is a side view of volute collector 50 that define the frame of reference for first and second volute passages 88 and 90, which are defined with respect to origin 96. Origin 96 is located at the intersection of plane 98 and pump axis 24 in which plane 98 bisects the cross-sections of first and second volute passages 88 and 90. Origin 96 defines a cylindrical coordinate system in which radial direction r is perpendicular to pump axis 24, angular direction θ is defined about pump axis 24 and increases in a counterclockwise direction from 0 degrees as shown in FIG. 9A, and axial direction z which is increasingly positive as shown in FIG. 9B. First volute passage 88 extends from 0 degrees through first angle α whereas second volute passage 90 extends through second angle β. The sum of first and second angles α and β is 360 degrees. In some embodiments, first angle α is greater than or equal to 190 degrees and less than or equal to 200 degrees.

Alternatively, first volute passage 88, second volute passage, 90, and diffuser 92 can be defined with respect to a Cartesian coordinate system that is analogous to the cylindrical coordinate system defined by origin 96. Such a coordinate system has an origin that is collocated with origin 96 in which an x-axis extends radially at θ equal to 0 degrees, a y-axis extends radially at θ equal to 90 degrees, and a z-axis extends axially along axis 24.

Figure 10A:
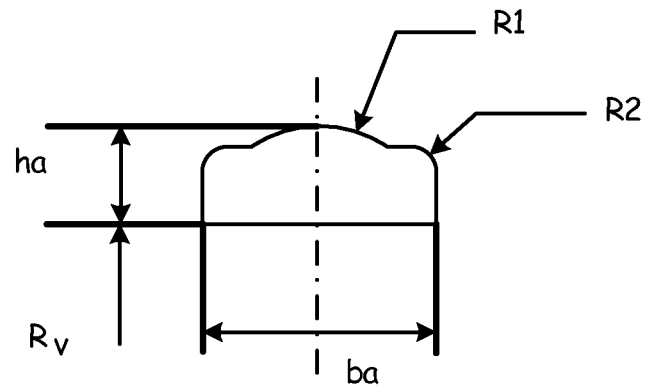
FIG. 10A is a detail view of a cross-section of the first volute passage.

FIG. 10A is a detailed view of a cross-section of first volute passage 88 taken along the line 10A-10A and defined with respect to origin 96. Cross-section 99a has inside radius Rv, height ha, width ba, first radius R1, and second radius R2. First radius R1 and second radius R2 correspond to ball-end mill sizes used during the manufacture of housing 28 and center plate 30 (see FIGS. 6-7). Inside radius Rv, height ha, and width ba are defined as a function of first angle α, the dimensions being selected based on the flow rate, dynamic pressure, and static pressure conditions along the circumferential outlet of impeller 26. In some embodiments, first radius R1 is equal to or between 0.1250 inches and 0.3750 inches, a preferable size being 0.1563 inches, and second radius R2 is equal to or between 0.0156 inches and 0.0469 inches, a preferable size being 0.0313 inches. Moreover, inside radius Rv, height ha, and width ba are defined as a ratio with respect to outer impeller diameter D (see FIG. 4) and presented as ratio Rv/D, ratio ha/D, and ratio ba/D in Table 6. The geometric parameters defined in Table 6 are listed to the nearest ten-thousandth of an inch. However, geometric parameters within +/−0.010 inches of Table 6 are within the design tolerances of volute collector 50.

Figure 10B:
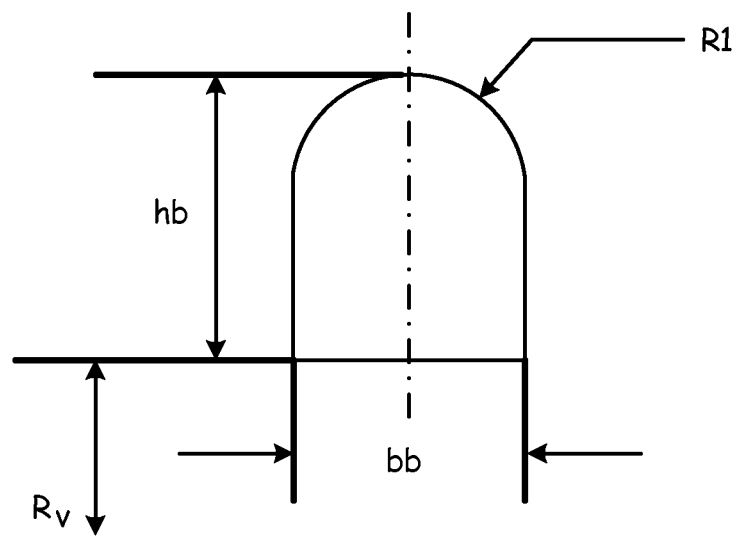
FIG. 10B is a detailed view of a cross-section of the second volute passage.

FIG. 10B is a detailed view of a cross-section of second volute passage 90 taken along the line 10B-10B and is defined with respect to origin 96. Cross-section 99b has inside radius Rv, height hb, width bb, and first radius R1. First radius R1 is defined as previously described. In cross-section 10B-10B, inside radius Rv, height hb, and width bb are defined as a ratio with respect to outer impeller diameter D (see FIG. 4) and presented as ratio Rv/D, ratio hb/D, and ratio bb/D in Table 7. The geometric parameters defined in Table 7 are listed to the nearest ten-thousandth of an inch. However, geometric parameters within +/−0.010 inches of Table 7 are within the design tolerances of volute collector 50.

FIG. 11A is a plan view and 11B is a side view of volute collector 50 that define the frame of reference for diffuser passage 92 and exit bend 94. Diffuser passage 92 is defined with respect to origin 96, which defines a cylindrical coordinate system as previously described, and exit bend 94 is defined with respect to origin 100. Origin 100 is located on plane 98 but is offset from pump axis 24 by radial distance R offset and angular distance θ offset. Diffuser passage 92 is a straight passage of continuously increasing area in which the cross-section at the inlet of diffuser passage 92 is equal to the outlet cross-section of second volute passage 90 and the outlet cross-section of diffuser passage 92 is equal to the inlet cross-section of exit bend 94. Exit bend 94 extends between included angle φ and has a cross-section taken along line 12-12 as shown in FIG. 11A. Each cross-section 101 of exit bend 94 has bend radius Rb and an axial offset z offset as shown in FIG. 11B to gradually direct the fuel flow towards boost pump outlet 89.

Alternatively, exit bend 94 can be defined with respect to a Cartesian coordinate system that is analogous to the cylindrical coordinate system defined by origin 100. Such a coordinate system has an origin that is collocated with origin 100 in which an x-axis extends radially at φ equal to 0 degrees, a y-axis extends radially at φ equal to 90 degrees, and a z-axis extends parallel to axis 24.

Figure 12:
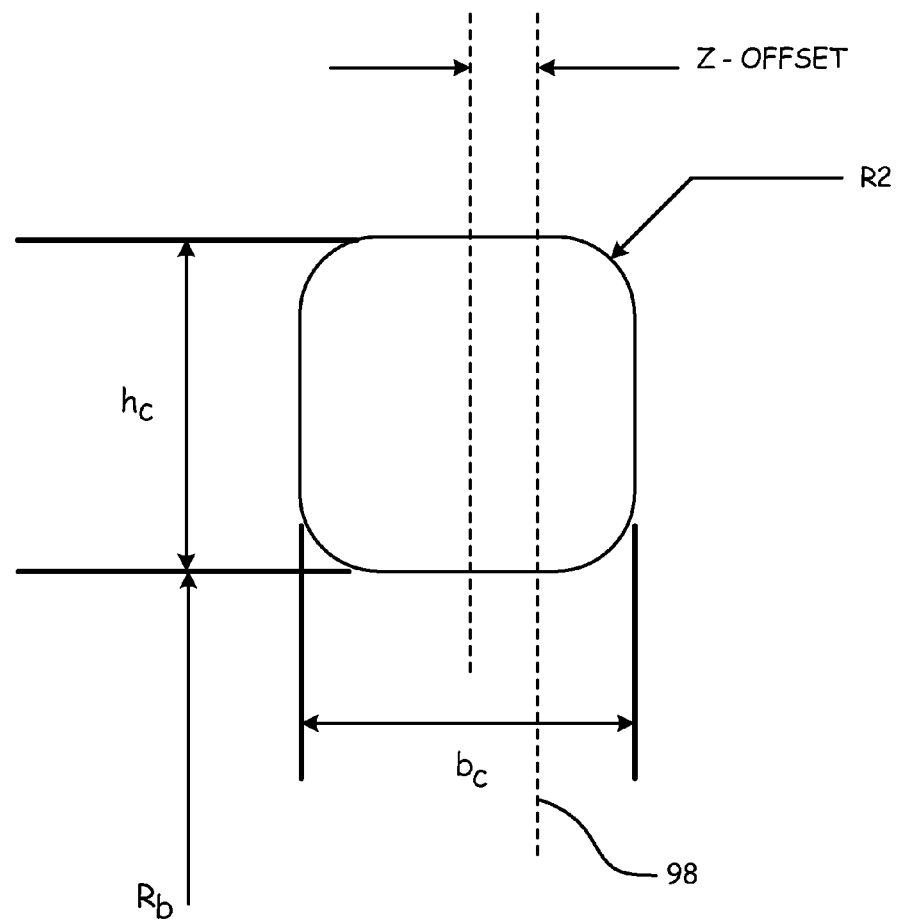
FIG. 12 is a detail view of a cross-section of the exit bend in FIGS. 11A and 11B.

FIG. 12 is a detail view of a cross-section of exit bend 94 taken along the line 12-12. Cross-section 101 has a generally rectangular cross-section defined by height hc, width bc, axial offset z offset, and second radius R2. Second radius R2 is defined as previously described. Height hc, width bc, and axial offset z offset are presented as ratios with respect to outer impeller diameter D (see FIG. 4). In some embodiments, ratio hc/D, ratio bc/D, and ratio z offset/D are defined as presented in Table 8. The geometric parameters defined in Table 8 are listed to the nearest ten-thousandth of an inch; however, geometric parameters within +/−0.010 inches of Table 8 are within the design tolerances of volute collector 50.

A method of making a centrifugal pump that has impeller 26 and volute collector 50 in accordance with the preceding description is also disclosed. The method includes forming impeller 26 with inducer section 58. As previously described, inducer section 58 has primary blades 62 and secondary blades 64 defined by a series of cross-sections. The method can further include forming impeller 26 with impeller section 60. Impeller section 60 has main blades 66, primary splitter blades 68, and secondary splitter blades 70. Blades 66, 68, and 70 are defined by a series of cross-sections. In each case, the cross-section can be represented by blade cross-section 74 having vertices 76, 78, 80, and 82.

The method can further include forming shroud 27 on the radially outward side of blades 66, 68, and 70. Additionally, the method can include forming a hub joining the inducer and impeller sections as previously shown and described above.

The method can further include forming housing 28 that includes walls defining first volute passage 88, second volute passage 90, and diffuser passage 92. Passages 88, 90, and 92 are defined by a series of cross-sectional areas as previously described. The walls of housing 28 can also define exit bend 94, similarly defined by a series of cross-sectional areas.

In some embodiments of the method, housing 28 can cooperate with center plate 30, each defining a portion of first volute passage 88, second volute passage 90, and diffuser passage 92. Housing 28 can have a facing relationship with center plate 30 such that each portion of passages 88, 90, and 92 cooperate to form a volute collector 50.

Tables 1-8 are provided below.

TABLE 1

| | Inducer Section - Primary Blades | | | | | | | | | | |
|---|---|---|---|---|---|---|---|---|---|---|---|
| | Vertex 76 (shroud pressure side) | | | Vertex 78 (shroud suction side) | | | Vertex 80 (hub suction side) | | | Vertex 82 (hub pressure side) | | |
| Cross-section Number | r/D [in/in] | θ [deg] | z/D [in/in] | r/D [in/in] | θ [deg] | z/D [in/in] | r/D [in/in] | θ [deg] | z/D [in/in] | r/D [in/in] | θ [deg] | z/D [in/in] |
|---|---|---|---|---|---|---|---|---|---|---|---|---|
| 1 | 0.2182 | 359.86 | 0.5343 | 0.2182 | 0.14 | 0.5391 | 0.0727 | 357.80 | 0.5324 | 0.0727 | 2.20 | 0.5411 |
| 2 | 0.2182 | 0.32 | 0.5338 | 0.2182 | 0.60 | 0.5389 | 0.0727 | 358.13 | 0.5317 | 0.0727 | 2.79 | 0.5410 |
| 3 | 0.2182 | 1.40 | 0.5328 | 0.2182 | 1.70 | 0.5381 | 0.0727 | 359.09 | 0.5305 | 0.0727 | 4.01 | 0.5404 |
| 4 | 0.2182 | 3.00 | 0.5314 | 0.2182 | 3.31 | 0.5368 | 0.0727 | 0.55 | 0.5289 | 0.0727 | 5.76 | 0.5393 |
| 5 | 0.2182 | 5.06 | 0.5297 | 0.2182 | 5.38 | 0.5353 | 0.0727 | 2.48 | 0.5269 | 0.0727 | 7.95 | 0.5378 |
| 6 | 0.2182 | 7.55 | 0.5276 | 0.2182 | 7.88 | 0.5334 | 0.0727 | 4.84 | 0.5246 | 0.0727 | 10.58 | 0.5360 |
| 7 | 0.2182 | 10.44 | 0.5251 | 0.2182 | 10.78 | 0.5311 | 0.0727 | 7.60 | 0.5219 | 0.0727 | 13.63 | 0.5338 |
| 8 | 0.2182 | 13.72 | 0.5224 | 0.2182 | 14.08 | 0.5285 | 0.0727 | 10.76 | 0.5188 | 0.0727 | 17.06 | 0.5314 |
| 9 | 0.2182 | 17.38 | 0.5193 | 0.2182 | 17.74 | 0.5256 | 0.0727 | 14.28 | 0.5155 | 0.0727 | 20.85 | 0.5286 |
| 10 | 0.2182 | 21.39 | 0.5160 | 0.2182 | 21.76 | 0.5225 | 0.0727 | 18.16 | 0.5119 | 0.0727 | 25.00 | 0.5255 |
| 11 | 0.2182 | 25.76 | 0.5123 | 0.2182 | 26.14 | 0.5191 | 0.0727 | 22.39 | 0.5079 | 0.0727 | 29.51 | 0.5221 |
| 12 | 0.2182 | 30.46 | 0.5084 | 0.2182 | 30.85 | 0.5153 | 0.0727 | 26.96 | 0.5037 | 0.0727 | 34.35 | 0.5184 |
| 13 | 0.2182 | 35.50 | 0.5042 | 0.2182 | 35.90 | 0.5113 | 0.0727 | 31.87 | 0.4992 | 0.0727 | 39.54 | 0.5145 |
| 14 | 0.2182 | 40.86 | 0.4998 | 0.2182 | 41.27 | 0.5071 | 0.0727 | 37.09 | 0.4944 | 0.0727 | 45.04 | 0.5102 |
| 15 | 0.2182 | 46.54 | 0.4951 | 0.2182 | 46.96 | 0.5026 | 0.0727 | 42.64 | 0.4894 | 0.0727 | 50.86 | 0.5057 |
| 16 | 0.2182 | 52.54 | 0.4902 | 0.2182 | 52.97 | 0.4978 | 0.0727 | 48.65 | 0.4844 | 0.0727 | 56.86 | 0.5007 |
| 17 | 0.2182 | 58.84 | 0.4850 | 0.2182 | 59.28 | 0.4928 | 0.0727 | 54.95 | 0.4791 | 0.0727 | 63.17 | 0.4954 |
| 18 | 0.2182 | 65.45 | 0.4795 | 0.2182 | 65.90 | 0.4875 | 0.0727 | 61.56 | 0.4735 | 0.0727 | 69.78 | 0.4899 |
| 19 | 0.2182 | 72.35 | 0.4738 | 0.2182 | 72.82 | 0.4820 | 0.0727 | 68.47 | 0.4677 | 0.0727 | 76.68 | 0.4841 |
| 20 | 0.2182 | 79.55 | 0.4679 | 0.2182 | 80.02 | 0.4763 | 0.0727 | 75.68 | 0.4617 | 0.0727 | 83.90 | 0.4781 |
| 21 | 0.2182 | 87.03 | 0.4617 | 0.2182 | 87.52 | 0.4703 | 0.0728 | 83.17 | 0.4554 | 0.0727 | 91.38 | 0.4718 |
| 22 | 0.2182 | 94.81 | 0.4553 | 0.2182 | 95.30 | 0.4641 | 0.0728 | 90.95 | 0.4489 | 0.0727 | 99.16 | 0.4653 |
| 23 | 0.2182 | 102.86 | 0.4487 | 0.2182 | 103.37 | 0.4577 | 0.0730 | 99.02 | 0.4422 | 0.0727 | 107.21 | 0.4585 |
| 24 | 0.2182 | 111.20 | 0.4419 | 0.2182 | 111.72 | 0.4510 | 0.0732 | 107.39 | 0.4352 | 0.0727 | 115.52 | 0.4515 |
| 25 | 0.2182 | 119.81 | 0.4348 | 0.2182 | 120.34 | 0.4441 | 0.0734 | 116.03 | 0.4279 | 0.0729 | 124.12 | 0.4443 |
| 26 | 0.2182 | 128.70 | 0.4276 | 0.2182 | 129.23 | 0.4369 | 0.0737 | 124.94 | 0.4205 | 0.0731 | 133.00 | 0.4368 |
| 27 | 0.2182 | 137.86 | 0.4202 | 0.2182 | 138.40 | 0.4295 | 0.0741 | 134.14 | 0.4128 | 0.0733 | 142.13 | 0.4292 |
| 28 | 0.2182 | 147.30 | 0.4126 | 0.2182 | 147.83 | 0.4219 | 0.0746 | 143.62 | 0.4049 | 0.0736 | 151.52 | 0.4213 |
| 29 | 0.2182 | 157.00 | 0.4047 | 0.2182 | 157.52 | 0.4140 | 0.0751 | 153.35 | 0.3967 | 0.0740 | 161.16 | 0.4132 |
| 30 | 0.2182 | 166.95 | 0.3967 | 0.2182 | 167.49 | 0.4060 | 0.0758 | 163.36 | 0.3884 | 0.0745 | 171.07 | 0.4048 |
| 31 | 0.2182 | 177.17 | 0.3884 | 0.2182 | 177.71 | 0.3977 | 0.0765 | 173.65 | 0.3798 | 0.0751 | 181.23 | 0.3963 |
| 32 | 0.2182 | 187.66 | 0.3799 | 0.2182 | 188.18 | 0.3892 | 0.0773 | 184.19 | 0.3710 | 0.0758 | 191.65 | 0.3875 |
| 33 | 0.2182 | 198.39 | 0.3712 | 0.2182 | 198.92 | 0.3805 | 0.0783 | 195.01 | 0.3620 | 0.0765 | 202.30 | 0.3785 |
| 34 | 0.2182 | 209.38 | 0.3623 | 0.2182 | 209.91 | 0.3716 | 0.0793 | 206.08 | 0.3528 | 0.0774 | 213.22 | 0.3693 |
| 35 | 0.2182 | 220.62 | 0.3532 | 0.2182 | 221.15 | 0.3625 | 0.0805 | 217.40 | 0.3433 | 0.0784 | 224.36 | 0.3599 |
| 36 | 0.2182 | 232.08 | 0.3439 | 0.2182 | 232.61 | 0.3532 | 0.0818 | 228.95 | 0.3337 | 0.0795 | 235.75 | 0.3503 |
| 37 | 0.2182 | 243.75 | 0.3344 | 0.2182 | 244.29 | 0.3437 | 0.0832 | 240.80 | 0.3240 | 0.0808 | 247.24 | 0.3402 |
| 38 | 0.2182 | 255.63 | 0.3247 | 0.2182 | 256.17 | 0.3340 | 0.0847 | 252.84 | 0.3142 | 0.0822 | 258.95 | 0.3300 |
| 39 | 0.2182 | 267.68 | 0.3148 | 0.2182 | 268.22 | 0.3240 | 0.0864 | 265.06 | 0.3041 | 0.0838 | 270.83 | 0.3195 |
| 40 | 0.2182 | 279.89 | 0.3047 | 0.2182 | 280.43 | 0.3139 | 0.0882 | 277.44 | 0.2939 | 0.0855 | 282.88 | 0.3088 |
| 41 | 0.2182 | 292.22 | 0.2944 | 0.2182 | 292.78 | 0.3036 | 0.0902 | 289.95 | 0.2834 | 0.0874 | 295.05 | 0.2980 |
| 42 | 0.2182 | 304.68 | 0.2839 | 0.2182 | 305.23 | 0.2931 | 0.0923 | 302.56 | 0.2728 | 0.0894 | 307.35 | 0.2869 |
| 43 | 0.2182 | 317.22 | 0.2732 | 0.2182 | 317.79 | 0.2824 | 0.0946 | 315.26 | 0.2619 | 0.0916 | 319.75 | 0.2756 |
| 44 | 0.2182 | 329.84 | 0.2624 | 0.2182 | 330.41 | 0.2715 | 0.0971 | 328.03 | 0.2509 | 0.0941 | 332.23 | 0.2641 |
| 45 | 0.2182 | 342.50 | 0.2513 | 0.2182 | 343.08 | 0.2604 | 0.0998 | 340.84 | 0.2397 | 0.0967 | 344.73 | 0.2524 |
| 46 | 0.2182 | 355.18 | 0.2400 | 0.2182 | 355.76 | 0.2492 | 0.1026 | 353.65 | 0.2282 | 0.0995 | 357.29 | 0.2406 |
| 47 | 0.2182 | 7.84 | 0.2286 | 0.2182 | 8.44 | 0.2377 | 0.1057 | 6.45 | 0.2166 | 0.1025 | 9.83 | 0.2285 |
| 48 | 0.2182 | 20.49 | 0.2169 | 0.2182 | 21.09 | 0.2261 | 0.1087 | 19.22 | 0.2047 | 0.1058 | 22.36 | 0.2162 |
| 49 | 0.2182 | 33.08 | 0.2051 | 0.2182 | 33.70 | 0.2143 | 0.1116 | 31.93 | 0.1927 | 0.1090 | 34.85 | 0.2038 |
| 50 | 0.2182 | 45.59 | 0.1931 | 0.2182 | 46.23 | 0.2023 | 0.1144 | 44.54 | 0.1804 | 0.1120 | 47.27 | 0.1912 |
| 51 | 0.2182 | 58.01 | 0.1809 | 0.2182 | 58.66 | 0.1901 | 0.1170 | 57.06 | 0.1680 | 0.1149 | 59.62 | 0.1783 |
| 52 | 0.2182 | 70.31 | 0.1686 | 0.2182 | 70.98 | 0.1777 | 0.1196 | 69.44 | 0.1554 | 0.1177 | 71.85 | 0.1653 |
| 53 | 0.2182 | 82.47 | 0.1560 | 0.2182 | 83.16 | 0.1651 | 0.1219 | 81.69 | 0.1426 | 0.1203 | 83.95 | 0.1520 |
| 54 | 0.2182 | 94.48 | 0.1433 | 0.2182 | 95.18 | 0.1524 | 0.1241 | 93.76 | 0.1296 | 0.1227 | 95.90 | 0.1386 |

TABLE 2

Inducer Section - Secondary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r/D [in/in] | θ [deg] | z/D [in/in] | r/D [in/in] | θ [deg] | z/D [in/in] | r/D [in/in] | θ [deg] | z/D [in/in] | r/D [in/in] | θ [deg] | z/D [in/in] |
| 1-43 | 0 | 0 | 0 | 0 | 0 | 0 | 0 | 0 | 0 | 0 | 0 | 0 |
| 44 | 0.2182 | 269.98 | 0.2647 | 0.2182 | 270.27 | 0.2693 | 0.0965 | 268.79 | 0.2533 | 0.0946 | 271.46 | 0.2617 |
| 45 | 0.2182 | 282.62 | 0.2533 | 0.2182 | 282.95 | 0.2585 | 0.0994 | 281.31 | 0.2413 | 0.0971 | 284.26 | 0.2508 |
| 46 | 0.2182 | 295.28 | 0.2417 | 0.2182 | 295.66 | 0.2476 | 0.1024 | 293.88 | 0.2290 | 0.0997 | 297.05 | 0.2398 |
| 47 | 0.2182 | 307.93 | 0.2299 | 0.2182 | 308.35 | 0.2364 | 0.1057 | 306.45 | 0.2166 | 0.1025 | 309.84 | 0.2285 |
| 48 | 0.2182 | 320.55 | 0.2180 | 0.2182 | 321.03 | 0.2251 | 0.1089 | 318.99 | 0.2039 | 0.1056 | 322.59 | 0.2171 |
| 49 | 0.2182 | 333.12 | 0.2058 | 0.2182 | 333.65 | 0.2136 | 0.1120 | 331.49 | 0.1910 | 0.1086 | 335.29 | 0.2055 |
| 50 | 0.2182 | 345.61 | 0.1935 | 0.2182 | 346.20 | 0.2019 | 0.1150 | 343.91 | 0.1779 | 0.1115 | 347.91 | 0.1937 |
| 51 | 0.2182 | 358.01 | 0.1809 | 0.2182 | 358.66 | 0.1901 | 0.1177 | 356.23 | 0.1647 | 0.1142 | 0.44 | 0.1817 |
| 52 | 0.2182 | 10.31 | 0.1686 | 0.2182 | 10.98 | 0.1777 | 0.1202 | 8.58 | 0.1518 | 0.1170 | 12.70 | 0.1689 |
| 53 | 0.2182 | 22.47 | 0.1560 | 0.2182 | 23.16 | 0.1651 | 0.1226 | 20.78 | 0.1388 | 0.1196 | 24.85 | 0.1559 |

TABLE 3

Impeller Section - Main Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r/D [in/in] | θ [deg] | z/D [in/in] | r/D [in/in] | θ [deg] | z/D [in/in] | r/D [in/in] | θ [deg] | z/D [in/in] | r/D [in/in] | θ [deg] | z/D [in/in] |
| 1 | 0.2324 | 1.15 | 0.1149 | 0.2292 | 1.36 | 0.1184 | 0.1800 | 0.22 | 0.0521 | 0.1839 | 359.78 | 0.0497 |
| 2 | 0.2415 | 17.30 | 0.1073 | 0.2374 | 17.58 | 0.1109 | 0.1971 | 19.85 | 0.0438 | 0.2018 | 19.33 | 0.0415 |
| 3 | 0.2522 | 31.55 | 0.0998 | 0.2473 | 31.90 | 0.1033 | 0.2139 | 35.32 | 0.0371 | 0.2194 | 34.75 | 0.0350 |
| 4 | 0.2640 | 43.97 | 0.0927 | 0.2583 | 44.38 | 0.0962 | 0.2304 | 47.88 | 0.0317 | 0.2365 | 47.26 | 0.0297 |
| 5 | 0.2763 | 54.61 | 0.0863 | 0.2699 | 55.09 | 0.0897 | 0.2462 | 58.21 | 0.0272 | 0.2530 | 57.53 | 0.0253 |
| 6 | 0.2888 | 63.64 | 0.0805 | 0.2817 | 64.19 | 0.0839 | 0.2614 | 66.79 | 0.0234 | 0.2688 | 66.05 | 0.0216 |
| 7 | 0.3012 | 71.27 | 0.0755 | 0.2933 | 71.89 | 0.0788 | 0.2758 | 73.96 | 0.0202 | 0.2837 | 73.16 | 0.0184 |
| 8 | 0.3132 | 77.71 | 0.0710 | 0.3047 | 78.39 | 0.0743 | 0.2893 | 79.99 | 0.0175 | 0.2979 | 79.14 | 0.0158 |
| 9 | 0.3247 | 83.15 | 0.0672 | 0.3157 | 83.90 | 0.0703 | 0.3021 | 85.10 | 0.0152 | 0.3112 | 84.19 | 0.0136 |
| 10 | 0.3358 | 87.77 | 0.0638 | 0.3262 | 88.59 | 0.0668 | 0.3141 | 89.46 | 0.0132 | 0.3237 | 88.49 | 0.0116 |
| 11 | 0.3464 | 91.69 | 0.0608 | 0.3362 | 92.58 | 0.0638 | 0.3254 | 93.19 | 0.0114 | 0.3355 | 92.16 | 0.0100 |
| 12 | 0.3563 | 95.04 | 0.0582 | 0.3456 | 96.01 | 0.0611 | 0.3359 | 96.41 | 0.0100 | 0.3465 | 95.31 | 0.0086 |
| 13 | 0.3658 | 97.92 | 0.0560 | 0.3546 | 98.96 | 0.0587 | 0.3458 | 99.21 | 0.0087 | 0.3569 | 98.04 | 0.0073 |
| 14 | 0.3748 | 100.41 | 0.0539 | 0.3631 | 101.53 | 0.0567 | 0.3552 | 101.64 | 0.0076 | 0.3667 | 100.42 | 0.0063 |
| 15 | 0.3833 | 102.56 | 0.0522 | 0.3712 | 103.76 | 0.0548 | 0.3639 | 103.79 | 0.0066 | 0.3758 | 102.49 | 0.0054 |
| 16 | 0.3913 | 104.44 | 0.0506 | 0.3788 | 105.71 | 0.0532 | 0.3722 | 105.67 | 0.0058 | 0.3845 | 104.31 | 0.0046 |
| 17 | 0.3990 | 106.08 | 0.0493 | 0.3861 | 107.43 | 0.0517 | 0.3800 | 107.35 | 0.0050 | 0.3926 | 105.91 | 0.0039 |
| 18 | 0.4062 | 107.52 | 0.0480 | 0.3930 | 108.96 | 0.0504 | 0.3874 | 108.84 | 0.0044 | 0.4004 | 107.33 | 0.0033 |
| 19 | 0.4131 | 108.79 | 0.0470 | 0.3995 | 110.31 | 0.0492 | 0.3944 | 110.17 | 0.0038 | 0.4077 | 108.59 | 0.0028 |
| 20 | 0.4197 | 109.92 | 0.0460 | 0.4058 | 111.52 | 0.0482 | 0.4010 | 111.37 | 0.0033 | 0.4147 | 109.72 | 0.0023 |
| 21 | 0.4257 | 110.96 | 0.0452 | 0.4120 | 112.57 | 0.0472 | 0.4076 | 112.42 | 0.0028 | 0.4210 | 110.76 | 0.0020 |
| 22 | 0.4314 | 111.90 | 0.0444 | 0.4180 | 113.52 | 0.0463 | 0.4139 | 113.37 | 0.0024 | 0.4271 | 111.69 | 0.0016 |
| 23 | 0.4370 | 112.75 | 0.0437 | 0.4237 | 114.39 | 0.0455 | 0.4199 | 114.23 | 0.0021 | 0.4330 | 112.55 | 0.0014 |
| 24 | 0.4422 | 113.53 | 0.0431 | 0.4292 | 115.18 | 0.0448 | 0.4257 | 115.02 | 0.0017 | 0.4385 | 113.33 | 0.0011 |
| 25 | 0.4473 | 114.24 | 0.0426 | 0.4345 | 115.91 | 0.0441 | 0.4313 | 115.74 | 0.0015 | 0.4439 | 114.05 | 0.0009 |
| 26 | 0.4522 | 114.90 | 0.0421 | 0.4396 | 116.57 | 0.0435 | 0.4367 | 116.40 | 0.0012 | 0.4491 | 114.71 | 0.0007 |
| 27 | 0.4570 | 115.50 | 0.0416 | 0.4446 | 117.19 | 0.0429 | 0.4418 | 117.02 | 0.0010 | 0.4541 | 115.32 | 0.0005 |
| 28 | 0.4615 | 116.06 | 0.0412 | 0.4493 | 117.75 | 0.0424 | 0.4468 | 117.59 | 0.0008 | 0.4589 | 115.89 | 0.0004 |
| 29 | 0.4660 | 116.58 | 0.0408 | 0.4540 | 118.28 | 0.0419 | 0.4517 | 118.13 | 0.0006 | 0.4635 | 116.43 | 0.0003 |
| 30 | 0.4703 | 117.07 | 0.0405 | 0.4585 | 118.77 | 0.0415 | 0.4564 | 118.63 | 0.0005 | 0.4681 | 116.93 | 0.0002 |
| 31 | 0.4745 | 117.52 | 0.0402 | 0.4629 | 119.23 | 0.0411 | 0.4610 | 119.10 | 0.0004 | 0.4725 | 117.40 | 0.0001 |
| 32 | 0.4786 | 117.94 | 0.0399 | 0.4672 | 119.66 | 0.0408 | 0.4654 | 119.54 | 0.0003 | 0.4768 | 117.84 | 0.0001 |
| 33 | 0.4827 | 118.35 | 0.0396 | 0.4714 | 120.06 | 0.0404 | 0.4698 | 119.96 | 0.0002 | 0.4810 | 118.26 | −0.0002 |
| 34 | 0.4866 | 118.73 | 0.0394 | 0.4755 | 120.45 | 0.0401 | 0.4741 | 120.36 | 0.0000 | 0.4852 | 118.66 | 0.0000 |
| 35 | 0.4905 | 119.09 | 0.0392 | 0.4796 | 120.81 | 0.0399 | 0.4783 | 120.74 | 0.0000 | 0.4892 | 119.04 | 0.0000 |
| 36 | 0.4943 | 119.44 | 0.0390 | 0.4835 | 121.16 | 0.0396 | 0.4824 | 121.10 | 0.0000 | 0.4932 | 119.40 | 0.0000 |
| 37 | 0.4981 | 119.77 | 0.0388 | 0.4875 | 121.49 | 0.0394 | 0.4865 | 121.45 | 0.0000 | 0.4972 | 119.75 | 0.0000 |
| 38 | 0.5018 | 120.10 | 0.0386 | 0.4913 | 121.81 | 0.0392 | 0.4905 | 121.78 | 0.0000 | 0.5011 | 120.09 | 0.0000 |
| 39 | 0.5055 | 120.41 | 0.0385 | 0.4951 | 122.11 | 0.0390 | 0.4945 | 122.10 | 0.0000 | 0.5049 | 120.41 | 0.0000 |
| 40 | 0.5662 | 124.79 | 0.0385 | 0.5557 | 126.31 | 0.0390 | 0.5550 | 126.31 | 0.0000 | 0.5655 | 124.80 | 0.0000 |

TABLE 4

Impeller Section - Primary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r/D [in/in] | θ [deg] | z/D [in/in] | r/D [in/in] | θ [deg] | z/D [in/in] | r/D [in/in] | θ [deg] | z/D [in/in] | r/D [in/in] | θ [deg] | z/D [in/in] |
| 1-4 | 0 | 0 | 0 | 0 | 0 | 0 | 0 | 0 | 0 | 0 | 0 | 0 |
| 5 | 0.2752 | 90.70 | 0.0869 | 0.2711 | 91.00 | 0.0891 | 0.2475 | 94.09 | 0.0268 | 0.2518 | 93.66 | 0.0256 |
| 6 | 0.2875 | 99.74 | 0.0811 | 0.2830 | 100.09 | 0.0833 | 0.2627 | 102.66 | 0.0230 | 0.2674 | 102.18 | 0.0219 |
| 7 | 0.2998 | 107.38 | 0.0761 | 0.2947 | 107.78 | 0.0782 | 0.2772 | 109.82 | 0.0199 | 0.2823 | 109.30 | 0.0188 |
| 8 | 0.3117 | 113.83 | 0.0716 | 0.3062 | 114.27 | 0.0737 | 0.2908 | 115.85 | 0.0172 | 0.2964 | 115.29 | 0.0161 |
| 9 | 0.3232 | 119.28 | 0.0677 | 0.3172 | 119.77 | 0.0698 | 0.3037 | 120.95 | 0.0149 | 0.3096 | 120.35 | 0.0138 |
| 10 | 0.3342 | 123.90 | 0.0643 | 0.3278 | 124.44 | 0.0663 | 0.3157 | 125.30 | 0.0129 | 0.3221 | 124.65 | 0.0119 |
| 11 | 0.3447 | 127.83 | 0.0613 | 0.3379 | 128.43 | 0.0633 | 0.3271 | 129.02 | 0.0112 | 0.3338 | 128.33 | 0.0102 |
| 12 | 0.3546 | 131.20 | 0.0587 | 0.3474 | 131.85 | 0.0606 | 0.3377 | 132.23 | 0.0097 | 0.3448 | 131.49 | 0.0088 |
| 13 | 0.3640 | 134.09 | 0.0564 | 0.3564 | 134.79 | 0.0583 | 0.3476 | 135.02 | 0.0085 | 0.3551 | 134.23 | 0.0076 |
| 14 | 0.3729 | 136.58 | 0.0544 | 0.3650 | 137.34 | 0.0562 | 0.3570 | 137.45 | 0.0074 | 0.3648 | 136.61 | 0.0065 |
| 15 | 0.3814 | 138.75 | 0.0526 | 0.3731 | 139.56 | 0.0544 | 0.3658 | 139.58 | 0.0064 | 0.3739 | 138.69 | 0.0056 |
| 16 | 0.3894 | 140.63 | 0.0510 | 0.3808 | 141.50 | 0.0528 | 0.3741 | 141.46 | 0.0056 | 0.3825 | 140.52 | 0.0048 |
| 17 | 0.3969 | 142.29 | 0.0497 | 0.3881 | 143.21 | 0.0513 | 0.3820 | 143.12 | 0.0049 | 0.3906 | 142.13 | 0.0041 |
| 18 | 0.4041 | 143.74 | 0.0484 | 0.3950 | 144.73 | 0.0500 | 0.3894 | 144.60 | 0.0042 | 0.3983 | 143.56 | 0.0035 |
| 19 | 0.4110 | 145.02 | 0.0473 | 0.4017 | 146.07 | 0.0489 | 0.3964 | 145.93 | 0.0037 | 0.4056 | 144.83 | 0.0030 |
| 20 | 0.4175 | 146.16 | 0.0463 | 0.4080 | 147.27 | 0.0478 | 0.4031 | 147.12 | 0.0032 | 0.4126 | 145.97 | 0.0025 |
| 21 | 0.4238 | 147.18 | 0.0454 | 0.4139 | 148.33 | 0.0469 | 0.4095 | 148.19 | 0.0027 | 0.4191 | 146.99 | 0.0021 |
| 22 | 0.4297 | 148.10 | 0.0446 | 0.4197 | 149.31 | 0.0461 | 0.4156 | 149.16 | 0.0023 | 0.4255 | 147.91 | 0.0017 |
| 23 | 0.4355 | 148.93 | 0.0439 | 0.4252 | 150.20 | 0.0453 | 0.4214 | 150.04 | 0.0020 | 0.4315 | 148.74 | 0.0014 |
| 24 | 0.4409 | 149.69 | 0.0433 | 0.4305 | 151.01 | 0.0446 | 0.4270 | 150.85 | 0.0017 | 0.4373 | 149.49 | 0.0012 |
| 25 | 0.4462 | 150.38 | 0.0427 | 0.4356 | 151.76 | 0.0439 | 0.4324 | 151.60 | 0.0014 | 0.4428 | 150.19 | 0.0009 |
| 26 | 0.4513 | 151.01 | 0.0422 | 0.4405 | 152.45 | 0.0434 | 0.4375 | 152.29 | 0.0012 | 0.4482 | 150.83 | 0.0007 |
| 27 | 0.4562 | 151.59 | 0.0417 | 0.4453 | 153.09 | 0.0428 | 0.4425 | 152.93 | 0.0010 | 0.4534 | 151.42 | 0.0006 |
| 28 | 0.4610 | 152.13 | 0.0412 | 0.4499 | 153.68 | 0.0423 | 0.4473 | 153.52 | 0.0008 | 0.4584 | 151.96 | 0.0004 |
| 29 | 0.4656 | 152.63 | 0.0409 | 0.4543 | 154.23 | 0.0419 | 0.4520 | 154.08 | 0.0006 | 0.4632 | 152.47 | 0.0003 |
| 30 | 0.4701 | 153.09 | 0.0405 | 0.4587 | 154.74 | 0.0415 | 0.4565 | 154.61 | 0.0005 | 0.4679 | 152.95 | 0.0002 |
| 31 | 0.4745 | 153.52 | 0.0402 | 0.4629 | 155.23 | 0.0411 | 0.4610 | 155.10 | 0.0004 | 0.4725 | 153.40 | 0.0001 |
| 32 | 0.4786 | 153.95 | 0.0399 | 0.4672 | 155.66 | 0.0408 | 0.4654 | 155.54 | 0.0003 | 0.4768 | 153.84 | 0.0001 |
| 33 | 0.4827 | 154.35 | 0.0396 | 0.4714 | 156.06 | 0.0404 | 0.4698 | 155.96 | 0.0002 | 0.4810 | 154.26 | −0.0002 |
| 34 | 0.4866 | 154.73 | 0.0394 | 0.4755 | 156.45 | 0.0401 | 0.4741 | 156.36 | 0.0000 | 0.4852 | 154.66 | 0.0000 |
| 35 | 0.4905 | 155.09 | 0.0392 | 0.4796 | 156.81 | 0.0398 | 0.4783 | 156.74 | 0.0000 | 0.4892 | 155.04 | 0.0000 |
| 36 | 0.4943 | 155.44 | 0.0390 | 0.4835 | 157.16 | 0.0396 | 0.4824 | 157.10 | 0.0000 | 0.4932 | 155.40 | 0.0000 |
| 37 | 0.4981 | 155.77 | 0.0388 | 0.4874 | 157.49 | 0.0394 | 0.4865 | 157.45 | 0.0000 | 0.4972 | 155.75 | 0.0000 |
| 38 | 0.5018 | 156.10 | 0.0386 | 0.4913 | 157.81 | 0.0392 | 0.4905 | 157.78 | 0.0000 | 0.5011 | 156.09 | 0.0000 |
| 39 | 0.5055 | 156.41 | 0.0385 | 0.4951 | 158.11 | 0.0390 | 0.4944 | 158.10 | 0.0000 | 0.5049 | 156.41 | 0.0000 |
| 40 | 0.5662 | 160.79 | 0.0385 | 0.5557 | 162.31 | 0.0390 | 0.5551 | 162.31 | 0.0000 | 0.5655 | 160.80 | 0.0000 |

TABLE 5

Impeller Section - Secondary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r/D [in/in] | θ [deg] | z/D [in/in] | r/D [in/in] | θ [deg] | z/D [in/in] | r/D [in/in] | θ [deg] | z/D [in/in] | r/D [in/in] | θ [deg] | z/D [in/in] |
| 1-11 | 0 | 0 | 0 | 0 | 0 | 0 | 0 | 0 | 0 | 0 | 0 | 0 |
| 12 | 0.3531 | 113.33 | 0.0591 | 0.3489 | 113.71 | 0.0602 | 0.3392 | 114.08 | 0.0095 | 0.3433 | 113.65 | 0.0090 |
| 13 | 0.3625 | 116.22 | 0.0568 | 0.3579 | 116.65 | 0.0579 | 0.3491 | 116.87 | 0.0083 | 0.3536 | 116.39 | 0.0077 |
| 14 | 0.3715 | 118.72 | 0.0547 | 0.3664 | 119.20 | 0.0559 | 0.3584 | 119.30 | 0.0072 | 0.3634 | 118.76 | 0.0067 |
| 15 | 0.3800 | 120.88 | 0.0529 | 0.3745 | 121.42 | 0.0541 | 0.3672 | 121.43 | 0.0063 | 0.3726 | 120.84 | 0.0057 |
| 16 | 0.3880 | 122.77 | 0.0513 | 0.3821 | 123.37 | 0.0525 | 0.3754 | 123.31 | 0.0055 | 0.3812 | 122.66 | 0.0049 |
| 17 | 0.3957 | 124.42 | 0.0499 | 0.3894 | 125.08 | 0.0511 | 0.3832 | 124.98 | 0.0047 | 0.3894 | 124.27 | 0.0042 |
| 18 | 0.4029 | 125.87 | 0.0486 | 0.3962 | 126.59 | 0.0498 | 0.3906 | 126.47 | 0.0041 | 0.3972 | 125.70 | 0.0036 |
| 19 | 0.4098 | 127.15 | 0.0475 | 0.4028 | 127.94 | 0.0487 | 0.3976 | 127.79 | 0.0036 | 0.4045 | 126.97 | 0.0030 |
| 20 | 0.4164 | 128.28 | 0.0465 | 0.4090 | 129.14 | 0.0477 | 0.4042 | 128.99 | 0.0031 | 0.4115 | 128.10 | 0.0026 |
| 21 | 0.4227 | 129.29 | 0.0456 | 0.4150 | 130.21 | 0.0467 | 0.4105 | 130.06 | 0.0026 | 0.4181 | 129.11 | 0.0022 |
| 22 | 0.4287 | 130.21 | 0.0448 | 0.4207 | 131.19 | 0.0459 | 0.4166 | 131.04 | 0.0023 | 0.4245 | 130.03 | 0.0018 |
| 23 | 0.4345 | 131.04 | 0.0440 | 0.4261 | 132.08 | 0.0452 | 0.4223 | 131.92 | 0.0019 | 0.4306 | 130.85 | 0.0015 |
| 24 | 0.4401 | 131.80 | 0.0434 | 0.4314 | 132.90 | 0.0445 | 0.4279 | 132.74 | 0.0016 | 0.4364 | 131.61 | 0.0012 |
| 25 | 0.4454 | 132.49 | 0.0428 | 0.4364 | 133.65 | 0.0438 | 0.4332 | 133.49 | 0.0014 | 0.4420 | 132.30 | 0.0010 |
| 26 | 0.4505 | 133.12 | 0.0423 | 0.4413 | 134.34 | 0.0433 | 0.4383 | 134.18 | 0.0011 | 0.4474 | 132.93 | 0.0008 |
| 27 | 0.4555 | 133.69 | 0.0418 | 0.4460 | 134.98 | 0.0428 | 0.4432 | 134.82 | 0.0009 | 0.4526 | 133.52 | 0.0006 |
| 28 | 0.4603 | 134.23 | 0.0413 | 0.4506 | 135.58 | 0.0423 | 0.4480 | 135.43 | 0.0008 | 0.4577 | 134.06 | 0.0004 |
| 29 | 0.4650 | 134.72 | 0.0409 | 0.4550 | 136.13 | 0.0418 | 0.4527 | 135.99 | 0.0006 | 0.4626 | 134.57 | 0.0003 |
| 30 | 0.4695 | 135.18 | 0.0405 | 0.4593 | 136.65 | 0.0414 | 0.4572 | 136.52 | 0.0005 | 0.4673 | 135.04 | 0.0002 |
| 31 | 0.4739 | 135.60 | 0.0402 | 0.4635 | 137.14 | 0.0411 | 0.4615 | 137.01 | 0.0004 | 0.4719 | 135.48 | 0.0001 |

TABLE 5-continued

Impeller Section - Secondary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r/D [in/in] | θ [deg] | z/D [in/in] | r/D [in/in] | θ [deg] | z/D [in/in] | r/D [in/in] | θ [deg] | z/D [in/in] | r/D [in/in] | θ [deg] | z/D [in/in] |
| 32 | 0.4782 | 136.00 | 0.0399 | 0.4676 | 137.60 | 0.0407 | 0.4658 | 137.49 | 0.0003 | 0.4764 | 135.90 | 0.0001 |
| 33 | 0.4825 | 136.38 | 0.0396 | 0.4716 | 138.03 | 0.0404 | 0.4700 | 137.93 | 0.0002 | 0.4809 | 136.29 | −0.0002 |
| 34 | 0.4866 | 136.73 | 0.0394 | 0.4755 | 138.45 | 0.0401 | 0.4741 | 138.36 | 0.0000 | 0.4852 | 136.66 | 0.0000 |
| 35 | 0.4905 | 137.09 | 0.0392 | 0.4796 | 138.81 | 0.0398 | 0.4783 | 138.74 | 0.0000 | 0.4892 | 137.04 | 0.0000 |
| 36 | 0.4943 | 137.44 | 0.0390 | 0.4835 | 139.16 | 0.0396 | 0.4824 | 139.10 | 0.0000 | 0.4932 | 137.40 | 0.0000 |
| 37 | 0.4981 | 137.77 | 0.0388 | 0.4874 | 139.49 | 0.0394 | 0.4865 | 139.45 | 0.0000 | 0.4972 | 137.75 | 0.0000 |
| 38 | 0.5018 | 138.10 | 0.0386 | 0.4913 | 139.81 | 0.0392 | 0.4905 | 139.78 | 0.0000 | 0.5011 | 138.09 | 0.0000 |
| 39 | 0.5055 | 138.41 | 0.0385 | 0.4951 | 140.11 | 0.0390 | 0.4944 | 140.10 | 0.0000 | 0.5049 | 138.41 | 0.0000 |
| 40 | 0.5662 | 142.79 | 0.0385 | 0.5557 | 144.31 | 0.0390 | 0.5551 | 144.31 | 0.0000 | 0.5655 | 142.80 | 0.0000 |

TABLE 6

Volute Collector - First Volute Passage

| Cross-section number | θ [deg] | Rv/D [in/in] | ha/D [in/in] | ba/D [in/in] |
|---|---|---|---|---|
| 1 | 15.00 | 0.5121 | 0.0015 | 0.1091 |
| 2 | 20.00 | 0.5121 | 0.0028 | 0.1091 |
| 3 | 25.00 | 0.5121 | 0.0040 | 0.1091 |
| 4 | 30.00 | 0.5121 | 0.0051 | 0.1091 |
| 5 | 35.00 | 0.5121 | 0.0061 | 0.1091 |
| 6 | 40.00 | 0.5121 | 0.0071 | 0.1091 |
| 7 | 45.00 | 0.5121 | 0.0081 | 0.1091 |
| 8 | 50.00 | 0.5121 | 0.0091 | 0.1091 |
| 9 | 55.00 | 0.5121 | 0.0101 | 0.1091 |
| 10 | 60.00 | 0.5121 | 0.0110 | 0.1091 |
| 11 | 65.00 | 0.5121 | 0.0120 | 0.1091 |
| 12 | 70.00 | 0.5121 | 0.0129 | 0.1091 |
| 13 | 75.00 | 0.5121 | 0.0138 | 0.1091 |
| 14 | 80.00 | 0.5121 | 0.0147 | 0.1091 |
| 15 | 85.00 | 0.5121 | 0.0157 | 0.1091 |
| 16 | 90.00 | 0.5121 | 0.0166 | 0.1091 |
| 17 | 95.00 | 0.5121 | 0.0175 | 0.1091 |
| 18 | 100.00 | 0.5121 | 0.0184 | 0.1091 |
| 19 | 105.00 | 0.5121 | 0.0193 | 0.1091 |
| 20 | 110.00 | 0.5121 | 0.0203 | 0.1091 |
| 21 | 115.00 | 0.5121 | 0.0212 | 0.1091 |
| 22 | 120.00 | 0.5121 | 0.0221 | 0.1091 |
| 23 | 125.00 | 0.5121 | 0.0231 | 0.1091 |
| 24 | 130.00 | 0.5121 | 0.0240 | 0.1091 |
| 25 | 135.00 | 0.5121 | 0.0249 | 0.1091 |
| 26 | 140.00 | 0.5121 | 0.0259 | 0.1091 |
| 27 | 145.00 | 0.5121 | 0.0268 | 0.1091 |
| 28 | 150.00 | 0.5121 | 0.0278 | 0.1091 |
| 29 | 155.00 | 0.5121 | 0.0288 | 0.1091 |
| 30 | 160.00 | 0.5121 | 0.0297 | 0.1091 |
| 31 | 165.00 | 0.5121 | 0.0307 | 0.1091 |
| 32 | 170.00 | 0.5121 | 0.0317 | 0.1091 |
| 33 | 175.00 | 0.5121 | 0.0327 | 0.1091 |
| 34 | 180.00 | 0.5121 | 0.0337 | 0.1091 |
| 35 | 185.00 | 0.5121 | 0.0348 | 0.1091 |
| 36 | 190.00 | 0.5121 | 0.0358 | 0.1091 |
| 37 | 195.00 | 0.5121 | 0.0369 | 0.1091 |

TABLE 7

Volute Collector - Second Volute Passage

| Cross-section number | θ [deg] | Rv/D [in/in] | hb/D [in/in] | bb/D [in/in] |
|---|---|---|---|---|
| 38 | 200.00 | 0.5121 | 0.0379 | 0.1091 |
| 39 | 205.00 | 0.5121 | 0.0390 | 0.1091 |
| 40 | 210.00 | 0.5121 | 0.0401 | 0.1091 |
| 41 | 215.00 | 0.5121 | 0.0412 | 0.1091 |
| 42 | 220.00 | 0.5121 | 0.0424 | 0.1091 |
| 43 | 225.00 | 0.5121 | 0.0435 | 0.1091 |
| 44 | 230.00 | 0.5121 | 0.0447 | 0.1091 |
| 45 | 235.00 | 0.5121 | 0.0458 | 0.1091 |
| 46 | 240.00 | 0.5121 | 0.0470 | 0.1091 |
| 47 | 245.00 | 0.5121 | 0.0482 | 0.1091 |
| 48 | 250.00 | 0.5121 | 0.0495 | 0.1091 |
| 49 | 255.00 | 0.5121 | 0.0507 | 0.1091 |
| 50 | 260.00 | 0.5121 | 0.0520 | 0.1091 |
| 51 | 265.00 | 0.5121 | 0.0532 | 0.1091 |
| 52 | 270.00 | 0.5121 | 0.0545 | 0.1091 |
| 53 | 275.00 | 0.5121 | 0.0559 | 0.1091 |
| 54 | 280.00 | 0.5121 | 0.0572 | 0.1091 |
| 55 | 285.00 | 0.5121 | 0.0585 | 0.1091 |
| 56 | 290.00 | 0.5121 | 0.0599 | 0.1091 |
| 57 | 295.00 | 0.5121 | 0.0613 | 0.1091 |
| 58 | 300.00 | 0.5121 | 0.0627 | 0.1091 |
| 59 | 305.00 | 0.5121 | 0.0642 | 0.1091 |
| 60 | 310.00 | 0.5121 | 0.0656 | 0.1091 |
| 61 | 315.00 | 0.5121 | 0.0672 | 0.1091 |
| 62 | 320.00 | 0.5121 | 0.0687 | 0.1091 |
| 63 | 325.00 | 0.5121 | 0.0702 | 0.1091 |
| 64 | 330.00 | 0.5121 | 0.0718 | 0.1091 |
| 65 | 335.00 | 0.5121 | 0.0733 | 0.1091 |
| 66 | 340.00 | 0.5121 | 0.0750 | 0.1091 |
| 67 | 345.00 | 0.5121 | 0.0766 | 0.1091 |
| 68 | 350.00 | 0.5121 | 0.0783 | 0.1091 |
| 69 | 355.00 | 0.5121 | 0.0799 | 0.1091 |
| 70 | 360.00 | 0.5121 | 0.0816 | 0.1091 |

TABLE 8

Volute Collector - Exit Bend

| Cross-section number | φ [deg] | Rb/D [in/in] | bc/D [in/in] | hc/D [in/in] | z-offset/D [in/in] |
|---|---|---|---|---|---|
| 1 | 3.89 | 0.315 | 0.1646 | 0.1432 | 0.0000 |
| 2 | 7.78 | 0.315 | 0.1671 | 0.1468 | 0.0001 |
| 3 | 11.66 | 0.314 | 0.1696 | 0.1504 | 0.0004 |
| 4 | 15.55 | 0.314 | 0.1721 | 0.1541 | 0.0010 |
| 5 | 19.44 | 0.314 | 0.1746 | 0.1577 | 0.0019 |
| 6 | 23.33 | 0.314 | 0.1771 | 0.1613 | 0.0033 |
| 7 | 27.21 | 0.313 | 0.1796 | 0.1649 | 0.0052 |
| 8 | 31.10 | 0.313 | 0.1821 | 0.1686 | 0.0078 |
| 9 | 34.99 | 0.313 | 0.1846 | 0.1722 | 0.0111 |
| 10 | 38.88 | 0.313 | 0.1871 | 0.1758 | 0.0152 |
| 11 | 42.76 | 0.312 | 0.1896 | 0.1795 | 0.0202 |
| 12 | 46.65 | 0.312 | 0.1921 | 0.1831 | 0.0262 |

TABLE 8-continued

Volute Collector - Exit Bend

| Cross-section number | φ [deg] | Rb/D [in/in] | bc/D [in/in] | hc/D [in/in] | z-offset/D [in/in] |
|---|---|---|---|---|---|
| 13 | 50.54 | 0.312 | 0.1946 | 0.1867 | 0.0333 |
| 14 | 54.43 | 0.312 | 0.1971 | 0.1904 | 0.0416 |
| 15 | 58.31 | 0.312 | 0.1996 | 0.1940 | 0.0511 |
| 16 | 62.20 | 0.311 | 0.2021 | 0.1976 | 0.0621 |
| 17 | 66.09 | 0.311 | 0.2046 | 0.2012 | 0.0744 |
| 18 | 69.98 | 0.311 | 0.2071 | 0.2049 | 0.0884 |
| 19 | 73.86 | 0.311 | 0.2096 | 0.2085 | 0.1039 |
| 20 | 77.75 | 0.310 | 0.2121 | 0.2121 | 0.1212 |

Tables 9-13 define blades 62, 64, 66, 68, and 70 in cylindrical coordinates (r, θ, z) for one embodiment of impeller 26. Tables 14-16 define first volute passage 88, second volute passage 90, and exit bend 94 for one embodiment of volute collector 50. In each embodiment, outer impeller diameter D equals 4.125 inches. Tables 9-16 are provided below.

TABLE 9

Inducer Section - Primary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 1 | 0.9000 | 359.86 | 2.2039 | 0.9000 | 0.14 | 2.2239 | 0.3000 | 357.80 | 2.1961 | 0.3000 | 2.20 | 2.2321 |
| 2 | 0.9000 | 0.32 | 2.2020 | 0.9000 | 0.60 | 2.2228 | 0.3000 | 358.13 | 2.1934 | 0.3000 | 2.79 | 2.2316 |
| 3 | 0.9000 | 1.40 | 2.1980 | 0.9000 | 1.70 | 2.2195 | 0.3000 | 359.09 | 2.1885 | 0.3000 | 4.01 | 2.2290 |
| 4 | 0.9000 | 3.00 | 2.1922 | 0.9000 | 3.31 | 2.2145 | 0.3000 | 0.55 | 2.1818 | 0.3000 | 5.76 | 2.2246 |
| 5 | 0.9000 | 5.06 | 2.1849 | 0.9000 | 5.38 | 2.2080 | 0.3000 | 2.48 | 2.1736 | 0.3000 | 7.95 | 2.2185 |
| 6 | 0.9000 | 7.55 | 2.1762 | 0.9000 | 7.88 | 2.2001 | 0.3000 | 4.84 | 2.1638 | 0.3000 | 10.58 | 2.2110 |
| 7 | 0.9000 | 10.44 | 2.1661 | 0.9000 | 10.78 | 2.1908 | 0.3000 | 7.60 | 2.1527 | 0.3000 | 13.63 | 2.2021 |
| 8 | 0.9000 | 13.72 | 2.1548 | 0.9000 | 14.08 | 2.1802 | 0.3000 | 10.76 | 2.1402 | 0.3000 | 17.06 | 2.1919 |
| 9 | 0.9000 | 17.38 | 2.1422 | 0.9000 | 17.74 | 2.1683 | 0.3000 | 14.28 | 2.1264 | 0.3001 | 20.85 | 2.1804 |
| 10 | 0.9000 | 21.39 | 2.1284 | 0.9000 | 21.76 | 2.1553 | 0.3000 | 18.16 | 2.1114 | 0.3000 | 25.00 | 2.1676 |
| 11 | 0.9000 | 25.76 | 2.1134 | 0.9000 | 26.14 | 2.1411 | 0.3000 | 22.39 | 2.0952 | 0.3000 | 29.51 | 2.1536 |
| 12 | 0.9000 | 30.46 | 2.0973 | 0.8999 | 30.85 | 2.1257 | 0.3000 | 26.96 | 2.0778 | 0.3000 | 34.35 | 2.1385 |
| 13 | 0.9000 | 35.50 | 2.0800 | 0.8999 | 35.90 | 2.1093 | 0.3000 | 31.87 | 2.0592 | 0.3000 | 39.54 | 2.1222 |
| 14 | 0.9000 | 40.86 | 2.0617 | 0.9000 | 41.27 | 2.0917 | 0.3000 | 37.09 | 2.0395 | 0.3000 | 45.04 | 2.1047 |
| 15 | 0.9000 | 46.54 | 2.0423 | 0.9000 | 46.96 | 2.0731 | 0.3000 | 42.64 | 2.0187 | 0.3000 | 50.86 | 2.0862 |
| 16 | 0.9000 | 52.54 | 2.0219 | 0.9000 | 52.97 | 2.0535 | 0.3000 | 48.65 | 1.9980 | 0.3000 | 56.86 | 2.0654 |
| 17 | 0.9000 | 58.84 | 2.0005 | 0.9000 | 59.28 | 2.0328 | 0.3000 | 54.95 | 1.9762 | 0.3000 | 63.17 | 2.0436 |
| 18 | 0.9000 | 65.45 | 1.9780 | 0.9000 | 65.90 | 2.0111 | 0.3000 | 61.56 | 1.9533 | 0.3000 | 69.78 | 2.0208 |
| 19 | 0.9000 | 72.35 | 1.9546 | 0.9000 | 72.82 | 1.9884 | 0.3000 | 68.47 | 1.9294 | 0.3000 | 76.68 | 1.9969 |
| 20 | 0.9000 | 79.55 | 1.9301 | 0.9000 | 80.02 | 1.9647 | 0.3000 | 75.68 | 1.9045 | 0.3000 | 83.90 | 1.9720 |
| 21 | 0.9000 | 87.03 | 1.9047 | 0.9000 | 87.52 | 1.9401 | 0.3001 | 83.17 | 1.8786 | 0.2999 | 91.38 | 1.9461 |
| 22 | 0.9000 | 94.81 | 1.8783 | 0.9000 | 95.30 | 1.9145 | 0.3004 | 90.95 | 1.8517 | 0.2997 | 99.16 | 1.9192 |
| 23 | 0.9000 | 102.86 | 1.8510 | 0.9000 | 103.37 | 1.8879 | 0.3010 | 99.02 | 1.8239 | 0.2998 | 107.21 | 1.8913 |
| 24 | 0.9000 | 111.20 | 1.8228 | 0.9000 | 111.72 | 1.8605 | 0.3018 | 107.39 | 1.7950 | 0.3001 | 115.52 | 1.8625 |
| 25 | 0.9000 | 119.81 | 1.7936 | 0.9000 | 120.34 | 1.8321 | 0.3028 | 116.03 | 1.7652 | 0.3005 | 124.12 | 1.8327 |
| 26 | 0.9001 | 128.70 | 1.7639 | 0.9000 | 129.23 | 1.8024 | 0.3041 | 124.94 | 1.7344 | 0.3013 | 133.00 | 1.8020 |
| 27 | 0.9000 | 137.86 | 1.7333 | 0.9000 | 138.40 | 1.7718 | 0.3057 | 134.14 | 1.7027 | 0.3024 | 142.17 | 1.7704 |
| 28 | 0.8999 | 147.30 | 1.7019 | 0.9000 | 147.83 | 1.7403 | 0.3077 | 143.62 | 1.6701 | 0.3036 | 151.52 | 1.7378 |
| 29 | 0.9000 | 157.00 | 1.6695 | 0.9000 | 157.52 | 1.7079 | 0.3099 | 153.35 | 1.6365 | 0.3054 | 161.16 | 1.7043 |
| 30 | 0.9000 | 166.95 | 1.6362 | 0.9000 | 167.49 | 1.6746 | 0.3125 | 163.36 | 1.6020 | 0.3073 | 171.07 | 1.6699 |
| 31 | 0.9000 | 177.17 | 1.6021 | 0.9000 | 177.71 | 1.6405 | 0.3155 | 173.65 | 1.5666 | 0.3098 | 181.23 | 1.6346 |
| 32 | 0.9000 | 187.66 | 1.5671 | 0.9000 | 188.18 | 1.6055 | 0.3190 | 184.19 | 1.5303 | 0.3125 | 191.65 | 1.5985 |
| 33 | 0.9000 | 198.39 | 1.5313 | 0.9000 | 198.92 | 1.5696 | 0.3228 | 195.01 | 1.4932 | 0.3157 | 202.30 | 1.5614 |
| 34 | 0.9000 | 209.38 | 1.4946 | 0.9000 | 209.91 | 1.5329 | 0.3271 | 206.08 | 1.4551 | 0.3193 | 213.22 | 1.5235 |
| 35 | 0.9000 | 220.62 | 1.4570 | 0.9000 | 221.15 | 1.4953 | 0.3319 | 217.40 | 1.4162 | 0.3234 | 224.36 | 1.4847 |
| 36 | 0.9000 | 232.08 | 1.4186 | 0.9000 | 232.61 | 1.4569 | 0.3373 | 228.95 | 1.3764 | 0.3280 | 235.75 | 1.4450 |
| 37 | 0.9000 | 243.75 | 1.3794 | 0.9000 | 244.29 | 1.4177 | 0.3431 | 240.80 | 1.3366 | 0.3332 | 247.24 | 1.4035 |
| 38 | 0.9000 | 255.63 | 1.3394 | 0.9000 | 256.17 | 1.3776 | 0.3494 | 252.84 | 1.2960 | 0.3391 | 258.95 | 1.3612 |
| 39 | 0.9000 | 267.68 | 1.2986 | 0.9000 | 268.22 | 1.3367 | 0.3562 | 265.06 | 1.2546 | 0.3455 | 270.83 | 1.3180 |
| 40 | 0.9000 | 279.89 | 1.2569 | 0.9000 | 280.43 | 1.2950 | 0.3638 | 277.44 | 1.2123 | 0.3527 | 282.88 | 1.2740 |
| 41 | 0.9000 | 292.22 | 1.2144 | 0.9000 | 292.78 | 1.2525 | 0.3719 | 289.95 | 1.1692 | 0.3604 | 295.05 | 1.2291 |
| 42 | 0.9000 | 304.68 | 1.1712 | 0.9000 | 305.23 | 1.2091 | 0.3807 | 302.56 | 1.1253 | 0.3689 | 307.35 | 1.1834 |
| 43 | 0.9000 | 317.22 | 1.1271 | 0.9000 | 317.79 | 1.1650 | 0.3903 | 315.26 | 1.0805 | 0.3780 | 319.75 | 1.1369 |
| 44 | 0.9000 | 329.84 | 1.0822 | 0.9000 | 330.41 | 1.1201 | 0.4006 | 328.03 | 1.0350 | 0.3880 | 332.23 | 1.0895 |
| 45 | 0.9000 | 342.50 | 1.0366 | 0.9000 | 343.08 | 1.0743 | 0.4116 | 340.84 | 0.9886 | 0.3988 | 344.73 | 1.0413 |
| 46 | 0.9000 | 355.18 | 0.9901 | 0.9000 | 355.76 | 1.0278 | 0.4234 | 353.65 | 0.9415 | 0.4104 | 357.29 | 0.9923 |
| 47 | 0.9000 | 7.84 | 0.9429 | 0.8999 | 8.44 | 0.9805 | 0.4359 | 6.45 | 0.8934 | 0.4230 | 9.83 | 0.9425 |
| 48 | 0.9000 | 20.49 | 0.8949 | 0.9000 | 21.09 | 0.9326 | 0.4484 | 19.22 | 0.8445 | 0.4366 | 22.36 | 0.8920 |
| 49 | 0.9000 | 33.08 | 0.8462 | 0.9000 | 33.70 | 0.8838 | 0.4604 | 31.93 | 0.7948 | 0.4496 | 34.85 | 0.8407 |
| 50 | 0.9000 | 45.59 | 0.7967 | 0.9000 | 46.23 | 0.8343 | 0.4719 | 44.54 | 0.7443 | 0.4622 | 47.27 | 0.7885 |

TABLE 9-continued

Inducer Section - Primary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 51 | 0.9000 | 58.01 | 0.7464 | 0.9000 | 58.66 | 0.7840 | 0.4828 | 57.06 | 0.6931 | 0.4741 | 59.62 | 0.7356 |
| 52 | 0.9000 | 70.31 | 0.6954 | 0.9000 | 70.98 | 0.7330 | 0.4932 | 69.44 | 0.6411 | 0.4854 | 71.85 | 0.6818 |
| 53 | 0.9000 | 82.47 | 0.6436 | 0.9000 | 83.16 | 0.6811 | 0.5029 | 81.69 | 0.5883 | 0.4961 | 83.95 | 0.6272 |
| 54 | 0.9000 | 94.48 | 0.5910 | 0.9000 | 95.18 | 0.6286 | 0.5121 | 93.76 | 0.5348 | 0.5061 | 95.90 | 0.5719 |

TABLE 10

Inducer Section - Secondary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 1-43 | 0 | 0 | 0 | 0 | 0 | 0 | 0 | 0 | 0 | 0 | 0 | 0 |
| 44 | 0.9000 | 269.98 | 1.0920 | 0.9000 | 270.27 | 1.1109 | 0.3982 | 268.79 | 1.0450 | 0.3902 | 271.46 | 1.0795 |
| 45 | 0.9000 | 282.62 | 1.0449 | 0.9000 | 282.95 | 1.0665 | 0.4100 | 281.31 | 0.9952 | 0.4003 | 284.26 | 1.0347 |
| 46 | 0.9000 | 295.28 | 0.9971 | 0.9000 | 295.66 | 1.0213 | 0.4226 | 293.88 | 0.9447 | 0.4112 | 297.05 | 0.9890 |
| 47 | 0.9000 | 307.93 | 0.9485 | 0.9000 | 308.35 | 0.9753 | 0.4360 | 306.45 | 0.8933 | 0.4230 | 309.84 | 0.9426 |
| 48 | 0.9000 | 320.55 | 0.8991 | 0.9000 | 321.03 | 0.9287 | 0.4493 | 318.99 | 0.8410 | 0.4357 | 322.59 | 0.8955 |
| 49 | 0.9000 | 333.12 | 0.8490 | 0.9000 | 333.65 | 0.8812 | 0.4620 | 331.49 | 0.7878 | 0.4480 | 335.29 | 0.8476 |
| 50 | 0.9000 | 345.61 | 0.7981 | 0.9000 | 346.20 | 0.8330 | 0.4742 | 343.91 | 0.7339 | 0.4599 | 347.91 | 0.7989 |
| 51 | 0.9000 | 358.01 | 0.7464 | 0.9000 | 358.66 | 0.7840 | 0.4856 | 356.23 | 0.6792 | 0.4712 | 0.44 | 0.7494 |
| 52 | 0.9000 | 10.31 | 0.6954 | 0.9000 | 10.98 | 0.7330 | 0.4960 | 8.58 | 0.6263 | 0.4826 | 12.70 | 0.6966 |
| 53 | 0.9000 | 22.47 | 0.6436 | 0.9000 | 23.16 | 0.6811 | 0.5057 | 20.78 | 0.5726 | 0.4933 | 24.85 | 0.6430 |

TABLE 11

Impeller Section - Main Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 1 | 0.9587 | 1.15 | 0.4740 | 0.9454 | 1.36 | 0.4885 | 0.7425 | 0.22 | 0.2149 | 0.7587 | 359.78 | 0.2049 |
| 2 | 0.9962 | 17.30 | 0.4426 | 0.9793 | 17.58 | 0.4573 | 0.8129 | 19.85 | 0.1805 | 0.8324 | 19.33 | 0.1712 |
| 3 | 1.0404 | 31.55 | 0.4116 | 1.0203 | 31.90 | 0.4263 | 0.8824 | 35.32 | 0.1530 | 0.9050 | 34.75 | 0.1444 |
| 4 | 1.0890 | 43.97 | 0.3824 | 1.0656 | 44.38 | 0.3970 | 0.9503 | 47.88 | 0.1306 | 0.9756 | 47.26 | 0.1225 |
| 5 | 1.1399 | 54.61 | 0.3559 | 1.1134 | 55.09 | 0.3702 | 1.0156 | 58.21 | 0.1120 | 1.0437 | 57.53 | 0.1043 |
| 6 | 1.1913 | 63.64 | 0.3322 | 1.1619 | 64.19 | 0.3462 | 1.0782 | 66.79 | 0.0964 | 1.1086 | 66.05 | 0.0890 |
| 7 | 1.2423 | 71.27 | 0.3113 | 1.2101 | 71.89 | 0.3250 | 1.1375 | 73.96 | 0.0832 | 1.1704 | 73.16 | 0.0761 |
| 8 | 1.2918 | 77.71 | 0.2930 | 1.2569 | 78.39 | 0.3064 | 1.1935 | 79.99 | 0.0720 | 1.2287 | 79.14 | 0.0652 |
| 9 | 1.3396 | 83.15 | 0.2770 | 1.3022 | 83.90 | 0.2900 | 1.2463 | 85.10 | 0.0625 | 1.2837 | 84.19 | 0.0559 |
| 10 | 1.3853 | 87.77 | 0.2630 | 1.3454 | 88.59 | 0.2757 | 1.2958 | 89.46 | 0.0543 | 1.3354 | 88.49 | 0.0480 |
| 11 | 1.4287 | 91.69 | 0.2508 | 1.3867 | 92.58 | 0.2631 | 1.3422 | 93.19 | 0.0472 | 1.3839 | 92.16 | 0.0412 |
| 12 | 1.4699 | 95.04 | 0.2401 | 1.4257 | 96.01 | 0.2521 | 1.3858 | 96.41 | 0.0412 | 1.4293 | 95.31 | 0.0353 |
| 13 | 1.5090 | 97.92 | 0.2308 | 1.4629 | 98.96 | 0.2423 | 1.4266 | 99.21 | 0.0359 | 1.4722 | 98.04 | 0.0303 |
| 14 | 1.5460 | 100.41 | 0.2225 | 1.4979 | 101.53 | 0.2338 | 1.4651 | 101.64 | 0.0313 | 1.5124 | 100.42 | 0.0260 |
| 15 | 1.5811 | 102.56 | 0.2153 | 1.5311 | 103.76 | 0.2261 | 1.5011 | 103.79 | 0.0273 | 1.5503 | 102.49 | 0.0222 |
| 16 | 1.6143 | 104.44 | 0.2089 | 1.5627 | 105.71 | 0.2194 | 1.5353 | 105.67 | 0.0238 | 1.5860 | 104.31 | 0.0189 |
| 17 | 1.6458 | 106.08 | 0.2032 | 1.5925 | 107.43 | 0.2134 | 1.5674 | 107.35 | 0.0208 | 1.6196 | 105.91 | 0.0161 |
| 18 | 1.6756 | 107.52 | 0.1982 | 1.6210 | 108.96 | 0.2080 | 1.5979 | 108.84 | 0.0181 | 1.6516 | 107.33 | 0.0137 |
| 19 | 1.7040 | 108.79 | 0.1937 | 1.6481 | 110.31 | 0.2031 | 1.6268 | 110.17 | 0.0157 | 1.6818 | 108.59 | 0.0115 |
| 20 | 1.7311 | 109.92 | 0.1897 | 1.6739 | 111.52 | 0.1987 | 1.6542 | 111.37 | 0.0136 | 1.7105 | 109.72 | 0.0097 |
| 21 | 1.7559 | 110.96 | 0.1863 | 1.6996 | 112.57 | 0.1947 | 1.6814 | 112.42 | 0.0117 | 1.7368 | 110.76 | 0.0081 |
| 22 | 1.7797 | 111.90 | 0.1832 | 1.7242 | 113.52 | 0.1910 | 1.7075 | 113.37 | 0.0100 | 1.7619 | 111.69 | 0.0068 |
| 23 | 1.8024 | 112.75 | 0.1804 | 1.7477 | 114.39 | 0.1876 | 1.7323 | 114.23 | 0.0085 | 1.7859 | 112.55 | 0.0056 |
| 24 | 1.8242 | 113.53 | 0.1779 | 1.7705 | 115.18 | 0.1846 | 1.7561 | 115.02 | 0.0072 | 1.8089 | 113.33 | 0.0046 |
| 25 | 1.8452 | 114.24 | 0.1756 | 1.7923 | 115.91 | 0.1818 | 1.7791 | 115.74 | 0.0060 | 1.8310 | 114.05 | 0.0037 |
| 26 | 1.8654 | 114.90 | 0.1735 | 1.8134 | 116.57 | 0.1793 | 1.8012 | 116.40 | 0.0050 | 1.8524 | 114.71 | 0.0029 |
| 27 | 1.8849 | 115.50 | 0.1717 | 1.8338 | 117.19 | 0.1770 | 1.8225 | 117.02 | 0.0041 | 1.8730 | 115.32 | 0.0022 |
| 28 | 1.9038 | 116.06 | 0.1699 | 1.8535 | 117.75 | 0.1749 | 1.8431 | 117.59 | 0.0033 | 1.8928 | 115.89 | 0.0017 |
| 29 | 1.9222 | 116.58 | 0.1684 | 1.8727 | 118.28 | 0.1730 | 1.8632 | 118.13 | 0.0027 | 1.9121 | 116.43 | 0.0012 |
| 30 | 1.9400 | 117.07 | 0.1670 | 1.8914 | 118.77 | 0.1712 | 1.8826 | 118.63 | 0.0021 | 1.9308 | 116.93 | 0.0008 |

TABLE 11-continued

Impeller Section - Main Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 31 | 1.9574 | 117.52 | 0.1657 | 1.9095 | 119.23 | 0.1696 | 1.9015 | 119.10 | 0.0016 | 1.9491 | 117.40 | 0.0005 |
| 32 | 1.9743 | 117.94 | 0.1645 | 1.9273 | 119.66 | 0.1681 | 1.9199 | 119.54 | 0.0011 | 1.9669 | 117.84 | 0.0003 |
| 33 | 1.9910 | 118.35 | 0.1634 | 1.9446 | 120.06 | 0.1668 | 1.9380 | 119.96 | 0.0009 | 1.9843 | 118.26 | −0.0009 |
| 34 | 2.0072 | 118.73 | 0.1625 | 1.9616 | 120.45 | 0.1655 | 1.9557 | 120.36 | 0.0000 | 2.0014 | 118.66 | 0.0000 |
| 35 | 2.0233 | 119.09 | 0.1616 | 1.9783 | 120.81 | 0.1644 | 1.9730 | 120.74 | 0.0000 | 2.0181 | 119.04 | 0.0000 |
| 36 | 2.0390 | 119.44 | 0.1608 | 1.9946 | 121.16 | 0.1633 | 1.9900 | 121.10 | 0.0000 | 2.0345 | 119.40 | 0.0000 |
| 37 | 2.0546 | 119.77 | 0.1600 | 2.0108 | 121.49 | 0.1624 | 2.0067 | 121.45 | 0.0000 | 2.0508 | 119.75 | 0.0000 |
| 38 | 2.0701 | 120.10 | 0.1594 | 2.0266 | 121.81 | 0.1615 | 2.0233 | 121.78 | 0.0000 | 2.0669 | 120.09 | 0.0000 |
| 39 | 2.0853 | 120.41 | 0.1588 | 2.0424 | 122.11 | 0.1607 | 2.0396 | 122.10 | 0.0000 | 2.0827 | 120.41 | 0.0000 |
| 40 | 2.3354 | 124.79 | 0.1588 | 2.2924 | 126.31 | 0.1607 | 2.2896 | 126.31 | 0.0000 | 2.3326 | 124.80 | 0.0000 |

TABLE 12

Impeller Section - Primary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 1-4 | 0.0 | 0.0 | 0.0 | 0.0 | 0.0 | 0.0 | 0.0 | 0.0 | 0.0 | 0.0 | 0.0 | 0.0 |
| 5 | 1.1351 | 90.70 | 0.3585 | 1.1183 | 91.00 | 0.3676 | 1.0208 | 94.09 | 0.1106 | 1.0385 | 93.66 | 0.1057 |
| 6 | 1.1861 | 99.74 | 0.3347 | 1.1672 | 100.09 | 0.3437 | 1.0836 | 102.66 | 0.0951 | 1.1032 | 102.18 | 0.0903 |
| 7 | 1.2366 | 107.38 | 0.3137 | 1.2157 | 107.78 | 0.3226 | 1.1433 | 109.82 | 0.0820 | 1.1646 | 109.30 | 0.0774 |
| 8 | 1.2858 | 113.83 | 0.2953 | 1.2630 | 114.27 | 0.3040 | 1.1996 | 115.85 | 0.0708 | 1.2226 | 115.29 | 0.0664 |
| 9 | 1.3332 | 119.28 | 0.2792 | 1.3085 | 119.77 | 0.2878 | 1.2526 | 120.95 | 0.0614 | 1.2773 | 120.35 | 0.0570 |
| 10 | 1.3785 | 123.90 | 0.2651 | 1.3521 | 124.44 | 0.2735 | 1.3024 | 125.30 | 0.0532 | 1.3287 | 124.65 | 0.0490 |
| 11 | 1.4217 | 127.83 | 0.2528 | 1.3936 | 128.43 | 0.2610 | 1.3491 | 129.02 | 0.0462 | 1.3769 | 128.33 | 0.0422 |
| 12 | 1.4627 | 131.20 | 0.2421 | 1.4330 | 131.85 | 0.2501 | 1.3929 | 132.23 | 0.0402 | 1.4222 | 131.49 | 0.0363 |
| 13 | 1.5015 | 134.09 | 0.2326 | 1.4703 | 134.79 | 0.2405 | 1.4340 | 135.02 | 0.0350 | 1.4647 | 134.23 | 0.0312 |
| 14 | 1.5383 | 136.58 | 0.2243 | 1.5057 | 137.34 | 0.2319 | 1.4727 | 137.45 | 0.0305 | 1.5047 | 136.61 | 0.0268 |
| 15 | 1.5731 | 138.75 | 0.2170 | 1.5391 | 139.56 | 0.2244 | 1.5090 | 139.58 | 0.0265 | 1.5424 | 138.69 | 0.0230 |
| 16 | 1.6061 | 140.63 | 0.2106 | 1.5709 | 141.50 | 0.2177 | 1.5433 | 141.46 | 0.0231 | 1.5779 | 140.52 | 0.0197 |
| 17 | 1.6374 | 142.29 | 0.2048 | 1.6010 | 143.21 | 0.2118 | 1.5756 | 143.12 | 0.0200 | 1.6114 | 142.13 | 0.0169 |
| 18 | 1.6671 | 143.74 | 0.1997 | 1.6296 | 144.73 | 0.2064 | 1.6063 | 144.60 | 0.0174 | 1.6431 | 143.56 | 0.0144 |
| 19 | 1.6953 | 145.02 | 0.1952 | 1.6568 | 146.07 | 0.2016 | 1.6353 | 145.93 | 0.0151 | 1.6732 | 144.83 | 0.0122 |
| 20 | 1.7222 | 146.16 | 0.1911 | 1.6828 | 147.27 | 0.1973 | 1.6629 | 147.12 | 0.0130 | 1.7018 | 145.97 | 0.0103 |
| 21 | 1.7480 | 147.18 | 0.1874 | 1.7075 | 148.33 | 0.1935 | 1.6893 | 148.19 | 0.0112 | 1.7290 | 146.99 | 0.0086 |
| 22 | 1.7726 | 148.10 | 0.1842 | 1.7312 | 149.31 | 0.1900 | 1.7144 | 149.16 | 0.0096 | 1.7550 | 147.91 | 0.0072 |
| 23 | 1.7963 | 148.93 | 0.1812 | 1.7539 | 150.20 | 0.1868 | 1.7384 | 150.04 | 0.0082 | 1.7799 | 148.74 | 0.0059 |
| 24 | 1.8189 | 149.69 | 0.1785 | 1.7757 | 151.01 | 0.1839 | 1.7614 | 150.85 | 0.0069 | 1.8037 | 149.49 | 0.0048 |
| 25 | 1.8407 | 150.38 | 0.1761 | 1.7968 | 151.76 | 0.1813 | 1.7835 | 151.60 | 0.0058 | 1.8267 | 150.19 | 0.0039 |
| 26 | 1.8617 | 151.01 | 0.1739 | 1.8170 | 152.45 | 0.1789 | 1.8048 | 152.29 | 0.0049 | 1.8488 | 150.83 | 0.0030 |
| 27 | 1.8820 | 151.59 | 0.1720 | 1.8367 | 153.09 | 0.1767 | 1.8254 | 152.93 | 0.0040 | 1.8701 | 151.42 | 0.0024 |
| 28 | 1.9017 | 152.13 | 0.1702 | 1.8557 | 153.68 | 0.1747 | 1.8452 | 153.52 | 0.0033 | 1.8907 | 151.96 | 0.0018 |
| 29 | 1.9207 | 152.63 | 0.1685 | 1.8741 | 154.23 | 0.1728 | 1.8645 | 154.08 | 0.0026 | 1.9107 | 152.47 | 0.0013 |
| 30 | 1.9393 | 153.09 | 0.1670 | 1.8921 | 154.74 | 0.1712 | 1.8833 | 154.61 | 0.0020 | 1.9302 | 152.95 | 0.0009 |
| 31 | 1.9574 | 153.52 | 0.1657 | 1.9096 | 155.23 | 0.1696 | 1.9015 | 155.10 | 0.0016 | 1.9491 | 153.40 | 0.0005 |
| 32 | 1.9743 | 153.95 | 0.1645 | 1.9273 | 155.66 | 0.1681 | 1.9199 | 155.54 | 0.0011 | 1.9669 | 153.84 | 0.0003 |
| 33 | 1.9909 | 154.35 | 0.1634 | 1.9446 | 156.06 | 0.1668 | 1.9380 | 155.96 | 0.0009 | 1.9843 | 154.26 | −0.0009 |
| 34 | 2.0072 | 154.73 | 0.1625 | 1.9616 | 156.45 | 0.1655 | 1.9556 | 156.36 | 0.0000 | 2.0014 | 154.66 | 0.0000 |
| 35 | 2.0233 | 155.09 | 0.1616 | 1.9782 | 156.81 | 0.1644 | 1.9730 | 156.74 | 0.0000 | 2.0181 | 155.04 | 0.0000 |
| 36 | 2.0390 | 155.44 | 0.1608 | 1.9946 | 157.16 | 0.1633 | 1.9900 | 157.10 | 0.0000 | 2.0346 | 155.40 | 0.0000 |
| 37 | 2.0546 | 155.77 | 0.1600 | 2.0107 | 157.49 | 0.1624 | 2.0068 | 157.45 | 0.0000 | 2.0508 | 155.75 | 0.0000 |
| 38 | 2.0700 | 156.10 | 0.1594 | 2.0266 | 157.81 | 0.1615 | 2.0233 | 157.78 | 0.0000 | 2.0668 | 156.09 | 0.0000 |
| 39 | 2.0854 | 156.41 | 0.1588 | 2.0424 | 158.11 | 0.1607 | 2.0396 | 158.10 | 0.0000 | 2.0826 | 156.41 | 0.0000 |
| 40 | 2.3354 | 160.79 | 0.1588 | 2.2924 | 162.31 | 0.1607 | 2.2896 | 162.31 | 0.0000 | 2.3326 | 160.80 | 0.0000 |

TABLE 13

Impeller Section - Secondary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | r [in] | θ [deg] | z [in] | r [in] | θ [deg] | z [in] | r [in] | θ [deg] | z [in] | r [in] | θ [deg] | z [in] |
| 1-11 | 0 | 0 | 0 | 0 | 0 | 0 | 0 | 0 | 0 | 0 | 0 | 0 |
| 12 | 1.4564 | 113.33 | 0.2438 | 1.4393 | 113.71 | 0.2484 | 1.3991 | 114.08 | 0.0394 | 1.4160 | 113.65 | 0.0371 |
| 13 | 1.4954 | 116.22 | 0.2342 | 1.4764 | 116.65 | 0.2389 | 1.4400 | 116.87 | 0.0342 | 1.4587 | 116.39 | 0.0319 |
| 14 | 1.5324 | 118.72 | 0.2257 | 1.5115 | 119.20 | 0.2306 | 1.4784 | 119.30 | 0.0298 | 1.4990 | 118.76 | 0.0275 |
| 15 | 1.5675 | 120.88 | 0.2182 | 1.5448 | 121.42 | 0.2232 | 1.5146 | 121.43 | 0.0259 | 1.5369 | 120.84 | 0.0236 |
| 16 | 1.6007 | 122.77 | 0.2117 | 1.5763 | 123.37 | 0.2166 | 1.5486 | 123.31 | 0.0226 | 1.5726 | 122.66 | 0.0202 |
| 17 | 1.6322 | 124.42 | 0.2058 | 1.6061 | 125.08 | 0.2108 | 1.5807 | 124.98 | 0.0196 | 1.6063 | 124.27 | 0.0173 |
| 18 | 1.6621 | 125.87 | 0.2006 | 1.6345 | 126.59 | 0.2055 | 1.6111 | 126.47 | 0.0170 | 1.6383 | 125.70 | 0.0148 |
| 19 | 1.6906 | 127.15 | 0.1960 | 1.6615 | 127.94 | 0.2008 | 1.6399 | 127.79 | 0.0147 | 1.6686 | 126.97 | 0.0125 |
| 20 | 1.7178 | 128.28 | 0.1918 | 1.6873 | 129.14 | 0.1966 | 1.6673 | 128.99 | 0.0127 | 1.6974 | 128.10 | 0.0106 |
| 21 | 1.7437 | 129.29 | 0.1881 | 1.7118 | 130.21 | 0.1928 | 1.6934 | 130.06 | 0.0109 | 1.7248 | 129.11 | 0.0089 |
| 22 | 1.7686 | 130.21 | 0.1847 | 1.7352 | 131.19 | 0.1894 | 1.7183 | 131.04 | 0.0094 | 1.7510 | 130.03 | 0.0074 |
| 23 | 1.7924 | 131.04 | 0.1817 | 1.7578 | 132.08 | 0.1863 | 1.7421 | 131.92 | 0.0080 | 1.7761 | 130.85 | 0.0061 |
| 24 | 1.8153 | 131.80 | 0.1790 | 1.7794 | 132.90 | 0.1835 | 1.7650 | 132.74 | 0.0068 | 1.8001 | 131.61 | 0.0050 |
| 25 | 1.8372 | 132.49 | 0.1765 | 1.8002 | 133.65 | 0.1809 | 1.7869 | 133.49 | 0.0057 | 1.8233 | 132.30 | 0.0040 |
| 26 | 1.8585 | 133.12 | 0.1743 | 1.8203 | 134.34 | 0.1785 | 1.8080 | 134.18 | 0.0047 | 1.8456 | 132.93 | 0.0032 |
| 27 | 1.8789 | 133.69 | 0.1723 | 1.8398 | 134.98 | 0.1764 | 1.8284 | 134.82 | 0.0039 | 1.8671 | 133.52 | 0.0025 |
| 28 | 1.8988 | 134.23 | 0.1704 | 1.8586 | 135.58 | 0.1744 | 1.8481 | 135.43 | 0.0032 | 1.8879 | 134.06 | 0.0019 |
| 29 | 1.9180 | 134.72 | 0.1688 | 1.8769 | 136.13 | 0.1726 | 1.8672 | 135.99 | 0.0025 | 1.9080 | 134.57 | 0.0013 |
| 30 | 1.9367 | 135.18 | 0.1673 | 1.8946 | 136.65 | 0.1709 | 1.8858 | 136.52 | 0.0020 | 1.9276 | 135.04 | 0.0009 |
| 31 | 1.9550 | 135.60 | 0.1659 | 1.9120 | 137.14 | 0.1694 | 1.9039 | 137.01 | 0.0015 | 1.9467 | 135.48 | 0.0006 |
| 32 | 1.9728 | 136.00 | 0.1646 | 1.9289 | 137.60 | 0.1680 | 1.9215 | 137.49 | 0.0011 | 1.9653 | 135.90 | 0.0003 |
| 33 | 1.9902 | 136.38 | 0.1635 | 1.9454 | 138.03 | 0.1667 | 1.9388 | 137.93 | 0.0009 | 1.9835 | 136.29 | −0.0009 |
| 34 | 2.0072 | 136.73 | 0.1625 | 1.9616 | 138.45 | 0.1655 | 1.9556 | 138.36 | 0.0000 | 2.0014 | 136.66 | 0.0000 |
| 35 | 2.0233 | 137.09 | 0.1616 | 1.9782 | 138.81 | 0.1644 | 1.9730 | 138.74 | 0.0000 | 2.0181 | 137.04 | 0.0000 |
| 36 | 2.0390 | 137.44 | 0.1608 | 1.9946 | 139.16 | 0.1633 | 1.9900 | 139.10 | 0.0000 | 2.0346 | 137.40 | 0.0000 |
| 37 | 2.0546 | 137.77 | 0.1600 | 2.0107 | 139.49 | 0.1624 | 2.0068 | 139.45 | 0.0000 | 2.0508 | 137.75 | 0.0000 |
| 38 | 2.0700 | 138.10 | 0.1594 | 2.0266 | 139.81 | 0.1615 | 2.0233 | 139.78 | 0.0000 | 2.0668 | 138.09 | 0.0000 |
| 39 | 2.0854 | 138.41 | 0.1588 | 2.0424 | 140.11 | 0.1607 | 2.0396 | 140.10 | 0.0000 | 2.0826 | 138.41 | 0.0000 |
| 40 | 2.3354 | 142.79 | 0.1588 | 2.2924 | 144.31 | 0.1607 | 2.2896 | 144.31 | 0.0000 | 2.3326 | 142.80 | 0.0000 |

TABLE 14

Volute Collector - First Volute Passage

| Cross-section number | θ [deg] | Rv [in] | ha [in] | ba [in] |
|---|---|---|---|---|
| 1 | 15.00 | 2.1125 | 0.0063 | 0.4500 |
| 2 | 20.00 | 2.1125 | 0.0116 | 0.4500 |
| 3 | 25.00 | 2.1125 | 0.0163 | 0.4500 |
| 4 | 30.00 | 2.1125 | 0.0209 | 0.4500 |
| 5 | 35.00 | 2.1125 | 0.0252 | 0.4500 |
| 6 | 40.00 | 2.1125 | 0.0294 | 0.4500 |
| 7 | 45.00 | 2.1125 | 0.0335 | 0.4500 |
| 8 | 50.00 | 2.1125 | 0.0376 | 0.4500 |
| 9 | 55.00 | 2.1125 | 0.0415 | 0.4500 |
| 10 | 60.00 | 2.1125 | 0.0455 | 0.4500 |
| 11 | 65.00 | 2.1125 | 0.0493 | 0.4500 |
| 12 | 70.00 | 2.1125 | 0.0532 | 0.4500 |
| 13 | 75.00 | 2.1125 | 0.0570 | 0.4500 |
| 14 | 80.00 | 2.1125 | 0.0608 | 0.4500 |
| 15 | 85.00 | 2.1125 | 0.0647 | 0.4500 |
| 16 | 90.00 | 2.1125 | 0.0684 | 0.4500 |
| 17 | 95.00 | 2.1125 | 0.0722 | 0.4500 |
| 18 | 100.00 | 2.1125 | 0.0760 | 0.4500 |
| 19 | 105.00 | 2.1125 | 0.0798 | 0.4500 |
| 20 | 110.00 | 2.1125 | 0.0836 | 0.4500 |
| 21 | 115.00 | 2.1125 | 0.0874 | 0.4500 |
| 22 | 120.00 | 2.1125 | 0.0913 | 0.4500 |
| 23 | 125.00 | 2.1125 | 0.0951 | 0.4500 |
| 24 | 130.00 | 2.1125 | 0.0990 | 0.4500 |
| 25 | 135.00 | 2.1125 | 0.1029 | 0.4500 |
| 26 | 140.00 | 2.1125 | 0.1068 | 0.4500 |
| 27 | 145.00 | 2.1125 | 0.1107 | 0.4500 |
| 28 | 150.00 | 2.1125 | 0.1147 | 0.4500 |
| 29 | 155.00 | 2.1125 | 0.1187 | 0.4500 |
| 30 | 160.00 | 2.1125 | 0.1227 | 0.4500 |
| 31 | 165.00 | 2.1125 | 0.1268 | 0.4500 |
| 32 | 170.00 | 2.1125 | 0.1309 | 0.4500 |
| 33 | 175.00 | 2.1125 | 0.1350 | 0.4500 |
| 34 | 180.00 | 2.1125 | 0.1392 | 0.4500 |
| 35 | 185.00 | 2.1125 | 0.1434 | 0.4500 |
| 36 | 190.00 | 2.1125 | 0.1477 | 0.4500 |
| 37 | 195.00 | 2.1125 | 0.1521 | 0.4500 |

TABLE 15

Volute Collector - Second Volute Passage

| Cross-section number | θ [deg] | Rv [in] | hb [in] | bb [in] |
|---|---|---|---|---|
| 38 | 200.00 | 2.1125 | 0.1565 | 0.4500 |
| 39 | 205.00 | 2.1125 | 0.1609 | 0.4500 |
| 40 | 210.00 | 2.1125 | 0.1654 | 0.4500 |
| 41 | 215.00 | 2.1125 | 0.1700 | 0.4500 |
| 42 | 220.00 | 2.1125 | 0.1747 | 0.4500 |
| 43 | 225.00 | 2.1125 | 0.1794 | 0.4500 |
| 44 | 230.00 | 2.1125 | 0.1842 | 0.4500 |
| 45 | 235.00 | 2.1125 | 0.1890 | 0.4500 |
| 46 | 240.00 | 2.1125 | 0.1939 | 0.4500 |
| 47 | 245.00 | 2.1125 | 0.1989 | 0.4500 |
| 48 | 250.00 | 2.1125 | 0.2040 | 0.4500 |
| 49 | 255.00 | 2.1125 | 0.2091 | 0.4500 |
| 50 | 260.00 | 2.1125 | 0.2143 | 0.4500 |
| 51 | 265.00 | 2.1125 | 0.2196 | 0.4500 |
| 52 | 270.00 | 2.1125 | 0.2249 | 0.4500 |

TABLE 15-continued

Volute Collector - Second Volute Passage

| Cross-section number | θ [deg] | Rv [in] | hb [in] | bb [in] |
|---|---|---|---|---|
| 53 | 275.00 | 2.1125 | 0.2304 | 0.4500 |
| 54 | 280.00 | 2.1125 | 0.2359 | 0.4500 |
| 55 | 285.00 | 2.1125 | 0.2415 | 0.4500 |
| 56 | 290.00 | 2.1125 | 0.2472 | 0.4500 |
| 57 | 295.00 | 2.1125 | 0.2530 | 0.4500 |
| 58 | 300.00 | 2.1125 | 0.2588 | 0.4500 |
| 59 | 305.00 | 2.1125 | 0.2648 | 0.4500 |
| 60 | 310.00 | 2.1125 | 0.2708 | 0.4500 |
| 61 | 315.00 | 2.1125 | 0.2770 | 0.4500 |
| 62 | 320.00 | 2.1125 | 0.2832 | 0.4500 |
| 63 | 325.00 | 2.1125 | 0.2895 | 0.4500 |
| 64 | 330.00 | 2.1125 | 0.2960 | 0.4500 |
| 65 | 335.00 | 2.1125 | 0.3025 | 0.4500 |
| 66 | 340.00 | 2.1125 | 0.3092 | 0.4500 |
| 67 | 345.00 | 2.1125 | 0.3159 | 0.4500 |
| 68 | 350.00 | 2.1125 | 0.3228 | 0.4500 |
| 69 | 355.00 | 2.1125 | 0.3297 | 0.4500 |
| 70 | 360.00 | 2.1125 | 0.3368 | 0.4500 |

TABLE 16

Volute Collector - Exit Bend

| Cross-section number | φ [deg] | Rb [in] | bc [in] | hc [in] | z-offset [in] |
|---|---|---|---|---|---|
| 1 | 3.89 | 1.299 | 0.6790 | 0.5906 | 0.0001 |
| 2 | 7.78 | 1.298 | 0.6893 | 0.6055 | 0.0005 |
| 3 | 11.66 | 1.297 | 0.6996 | 0.6205 | 0.0017 |
| 4 | 15.55 | 1.296 | 0.7100 | 0.6355 | 0.0040 |
| 5 | 19.44 | 1.295 | 0.7203 | 0.6505 | 0.0078 |
| 6 | 23.33 | 1.294 | 0.7306 | 0.6654 | 0.0135 |
| 7 | 27.21 | 1.293 | 0.7409 | 0.6804 | 0.0214 |
| 8 | 31.10 | 1.292 | 0.7512 | 0.6954 | 0.0320 |
| 9 | 34.99 | 1.291 | 0.7615 | 0.7103 | 0.0456 |
| 10 | 38.88 | 1.290 | 0.7719 | 0.7253 | 0.0625 |
| 11 | 42.76 | 1.289 | 0.7822 | 0.7403 | 0.0832 |
| 12 | 46.65 | 1.288 | 0.7925 | 0.7552 | 0.1080 |
| 13 | 50.54 | 1.287 | 0.8028 | 0.7702 | 0.1373 |
| 14 | 54.43 | 1.286 | 0.8131 | 0.7852 | 0.1715 |
| 15 | 58.31 | 1.285 | 0.8234 | 0.8002 | 0.2109 |
| 16 | 62.20 | 1.284 | 0.8337 | 0.8151 | 0.2560 |
| 17 | 66.09 | 1.283 | 0.8441 | 0.8301 | 0.3071 |
| 18 | 69.98 | 1.282 | 0.8544 | 0.8451 | 0.3645 |
| 19 | 73.86 | 1.281 | 0.8647 | 0.8600 | 0.4287 |
| 20 | 77.75 | 1.280 | 0.8750 | 0.8750 | 0.5000 |

Tables 17-21 define blades 62, 64, 66, 68, and 70 in Cartesian coordinates (x, y, z) for one embodiment of impeller 26 in which outer impeller diameter D equals 4.125 inches. Tables 17-21 are provided below.

TABLE 17

Inducer Section - Primary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 1 | 0.9000 | −0.0022 | 2.2039 | 0.9000 | 0.0022 | 2.2239 | 0.2998 | −0.0115 | 2.1961 | 0.2998 | 0.0115 | 2.2321 |
| 2 | 0.9000 | 0.0050 | 2.2020 | 0.8999 | 0.0095 | 2.2228 | 0.2998 | −0.0098 | 2.1934 | 0.2996 | 0.0146 | 2.2316 |
| 3 | 0.8997 | 0.0220 | 2.1980 | 0.8996 | 0.0267 | 2.2195 | 0.3000 | −0.0048 | 2.1885 | 0.2993 | 0.0210 | 2.2290 |
| 4 | 0.8988 | 0.0471 | 2.1922 | 0.8985 | 0.0519 | 2.2145 | 0.3000 | 0.0029 | 2.1818 | 0.2985 | 0.0301 | 2.2246 |
| 5 | 0.8965 | 0.0794 | 2.1849 | 0.8960 | 0.0844 | 2.2080 | 0.2997 | 0.0130 | 2.1736 | 0.2971 | 0.0415 | 2.2185 |
| 6 | 0.8922 | 0.1183 | 2.1762 | 0.8915 | 0.1234 | 2.2001 | 0.2989 | 0.0253 | 2.1638 | 0.2949 | 0.0551 | 2.2110 |
| 7 | 0.8851 | 0.1631 | 2.1661 | 0.8841 | 0.1684 | 2.1908 | 0.2974 | 0.0397 | 2.1527 | 0.2916 | 0.0707 | 2.2021 |
| 8 | 0.8743 | 0.2135 | 2.1548 | 0.8730 | 0.2189 | 2.1802 | 0.2947 | 0.0560 | 2.1402 | 0.2868 | 0.0880 | 2.1919 |
| 9 | 0.8589 | 0.2688 | 2.1422 | 0.8572 | 0.2742 | 2.1683 | 0.2907 | 0.0740 | 2.1264 | 0.2804 | 0.1068 | 2.1804 |
| 10 | 0.8380 | 0.3283 | 2.1284 | 0.8359 | 0.3337 | 2.1553 | 0.2851 | 0.0935 | 2.1114 | 0.2719 | 0.1268 | 2.1676 |
| 11 | 0.8106 | 0.3911 | 2.1134 | 0.8080 | 0.3965 | 2.1411 | 0.2774 | 0.1143 | 2.0952 | 0.2611 | 0.1478 | 2.1536 |
| 12 | 0.7758 | 0.4563 | 2.0973 | 0.7726 | 0.4615 | 2.1257 | 0.2674 | 0.1360 | 2.0778 | 0.2477 | 0.1693 | 2.1385 |
| 13 | 0.7327 | 0.5226 | 2.0800 | 0.7290 | 0.5277 | 2.1093 | 0.2548 | 0.1584 | 2.0592 | 0.2314 | 0.1910 | 2.1222 |
| 14 | 0.6807 | 0.5888 | 2.0617 | 0.6764 | 0.5937 | 2.0917 | 0.2393 | 0.1809 | 2.0395 | 0.2120 | 0.2123 | 2.1047 |
| 15 | 0.6190 | 0.6533 | 2.0423 | 0.6142 | 0.6578 | 2.0731 | 0.2207 | 0.2032 | 2.0187 | 0.1894 | 0.2327 | 2.0862 |
| 16 | 0.5474 | 0.7144 | 2.0219 | 0.5420 | 0.7185 | 2.0535 | 0.1982 | 0.2252 | 1.9980 | 0.1640 | 0.2512 | 2.0654 |
| 17 | 0.4657 | 0.7701 | 2.0005 | 0.4597 | 0.7737 | 2.0328 | 0.1723 | 0.2456 | 1.9762 | 0.1354 | 0.2677 | 2.0436 |
| 18 | 0.3740 | 0.8186 | 1.9780 | 0.3675 | 0.8215 | 2.0111 | 0.1429 | 0.2638 | 1.9533 | 0.1037 | 0.2815 | 2.0208 |
| 19 | 0.2729 | 0.8576 | 1.9546 | 0.2659 | 0.8598 | 1.9884 | 0.1101 | 0.2791 | 1.9294 | 0.0691 | 0.2919 | 1.9969 |
| 20 | 0.1633 | 0.8851 | 1.9301 | 0.1560 | 0.8864 | 1.9647 | 0.0742 | 0.2907 | 1.9045 | 0.0319 | 0.2983 | 1.9720 |
| 21 | 0.0466 | 0.8988 | 1.9047 | 0.0390 | 0.8992 | 1.9401 | 0.0357 | 0.2980 | 1.8786 | −0.0072 | 0.2998 | 1.9461 |
| 22 | −0.0754 | 0.8968 | 1.8783 | −0.0832 | 0.8961 | 1.9145 | −0.0050 | 0.3004 | 1.8517 | −0.0477 | 0.2959 | 1.9192 |
| 23 | −0.2003 | 0.8774 | 1.8510 | −0.2081 | 0.8756 | 1.8879 | −0.0472 | 0.2973 | 1.8239 | −0.0887 | 0.2864 | 1.8913 |
| 24 | −0.3254 | 0.8391 | 1.8228 | −0.3330 | 0.8361 | 1.8605 | −0.0902 | 0.2880 | 1.7950 | −0.1293 | 0.2708 | 1.8625 |
| 25 | −0.4474 | 0.7809 | 1.7936 | −0.4546 | 0.7767 | 1.8321 | −0.1329 | 0.2721 | 1.7652 | −0.1686 | 0.2488 | 1.8327 |
| 26 | −0.5628 | 0.7024 | 1.7639 | −0.5692 | 0.6971 | 1.8024 | −0.1742 | 0.2493 | 1.7344 | −0.2055 | 0.2204 | 1.8020 |
| 27 | −0.6674 | 0.6038 | 1.7333 | −0.6730 | 0.5976 | 1.7718 | −0.2129 | 0.2194 | 1.7027 | −0.2387 | 0.1856 | 1.7704 |
| 28 | −0.7573 | 0.4862 | 1.7019 | −0.7618 | 0.4792 | 1.7403 | −0.2477 | 0.1825 | 1.6701 | −0.2669 | 0.1448 | 1.7378 |
| 29 | −0.8284 | 0.3517 | 1.6695 | −0.8316 | 0.3441 | 1.7079 | −0.2770 | 0.1390 | 1.6365 | −0.2890 | 0.0986 | 1.7043 |
| 30 | −0.8768 | 0.2032 | 1.6362 | −0.8786 | 0.1950 | 1.6746 | −0.2994 | 0.0895 | 1.6020 | −0.3036 | 0.0477 | 1.6699 |
| 31 | −0.8989 | 0.0444 | 1.6021 | −0.8993 | 0.0360 | 1.6405 | −0.3136 | 0.0349 | 1.5666 | −0.3097 | −0.0067 | 1.6346 |
| 32 | −0.8920 | −0.1199 | 1.5671 | −0.8908 | −0.1281 | 1.6055 | −0.3181 | −0.0233 | 1.5303 | −0.3061 | −0.0631 | 1.5985 |
| 33 | −0.8540 | −0.2839 | 1.5313 | −0.8514 | −0.2918 | 1.5696 | −0.3118 | −0.0836 | 1.4932 | −0.2921 | −0.1198 | 1.5614 |
| 34 | −0.7842 | −0.4416 | 1.4946 | −0.7801 | −0.4488 | 1.5329 | −0.2938 | −0.1438 | 1.4551 | −0.2671 | −0.1749 | 1.5235 |
| 35 | −0.6832 | −0.5859 | 1.4570 | −0.6777 | −0.5922 | 1.4953 | −0.2637 | −0.2016 | 1.4162 | −0.2312 | −0.2261 | 1.4847 |
| 36 | −0.5531 | −0.7100 | 1.4186 | −0.5465 | −0.7151 | 1.4569 | −0.2215 | −0.2544 | 1.3764 | −0.1846 | −0.2711 | 1.4450 |
| 37 | −0.3980 | −0.8072 | 1.3794 | −0.3904 | −0.8109 | 1.4177 | −0.1674 | −0.2995 | 1.3366 | −0.1289 | −0.3073 | 1.4035 |

TABLE 17-continued

Inducer Section - Primary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 38 | −0.2234 | −0.8718 | 1.3394 | −0.2152 | −0.8739 | 1.3776 | −0.1031 | −0.3338 | 1.2960 | −0.0650 | −0.3328 | 1.3612 |
| 39 | −0.0365 | −0.8993 | 1.2986 | −0.0280 | −0.8996 | 1.3367 | −0.0307 | −0.3549 | 1.2546 | 0.0050 | −0.3455 | 1.3180 |
| 40 | 0.1545 | −0.8866 | 1.2569 | 0.1629 | −0.8851 | 1.2950 | 0.0471 | −0.3607 | 1.2123 | 0.0786 | −0.3438 | 1.2740 |
| 41 | 0.3404 | −0.8331 | 1.2144 | 0.3484 | −0.8298 | 1.2525 | 0.1269 | −0.3496 | 1.1692 | 0.1526 | −0.3265 | 1.2291 |
| 42 | 0.5121 | −0.7401 | 1.1712 | 0.5192 | −0.7351 | 1.2091 | 0.2049 | −0.3209 | 1.1253 | 0.2238 | −0.2932 | 1.1834 |
| 43 | 0.6606 | −0.6112 | 1.1271 | 0.6666 | −0.6047 | 1.1650 | 0.2772 | −0.2747 | 1.0805 | 0.2885 | −0.2442 | 1.1369 |
| 44 | 0.7782 | −0.4522 | 1.0822 | 0.7826 | −0.4444 | 1.1201 | 0.3398 | −0.2121 | 1.0350 | 0.3433 | −0.1808 | 1.0895 |
| 45 | 0.8583 | −0.2707 | 1.0366 | 0.8610 | −0.2620 | 1.0743 | 0.3888 | −0.1351 | 0.9886 | 0.3847 | −0.1050 | 1.0413 |
| 46 | 0.8968 | −0.0757 | 0.9901 | 0.8975 | −0.0665 | 1.0278 | 0.4208 | −0.0468 | 0.9415 | 0.4099 | −0.0194 | 0.9923 |
| 47 | 0.8916 | 0.1228 | 0.9429 | 0.8902 | 0.1321 | 0.9805 | 0.4331 | 0.0490 | 0.8934 | 0.4168 | 0.0722 | 0.9425 |
| 48 | 0.8431 | 0.3150 | 0.8949 | 0.8397 | 0.3239 | 0.9326 | 0.4234 | 0.1476 | 0.8445 | 0.4038 | 0.1661 | 0.8920 |
| 49 | 0.7541 | 0.4912 | 0.8462 | 0.7488 | 0.4993 | 0.8838 | 0.3907 | 0.2435 | 0.7948 | 0.3690 | 0.2569 | 0.8407 |
| 50 | 0.6298 | 0.6429 | 0.7967 | 0.6226 | 0.6499 | 0.8343 | 0.3363 | 0.3310 | 0.7443 | 0.3136 | 0.3395 | 0.7885 |
| 51 | 0.4768 | 0.7633 | 0.7464 | 0.4681 | 0.7687 | 0.7840 | 0.2625 | 0.4052 | 0.6931 | 0.2398 | 0.4090 | 0.7356 |
| 52 | 0.3032 | 0.8474 | 0.6954 | 0.2933 | 0.8509 | 0.7330 | 0.1732 | 0.4618 | 0.6411 | 0.1512 | 0.4612 | 0.6818 |
| 53 | 0.1179 | 0.8922 | 0.6436 | 0.1072 | 0.8936 | 0.6811 | 0.0727 | 0.4976 | 0.5883 | 0.0523 | 0.4933 | 0.6272 |
| 54 | −0.0703 | 0.8973 | 0.5910 | −0.0813 | 0.8963 | 0.6286 | −0.0336 | 0.5110 | 0.5348 | −0.0520 | 0.5034 | 0.5719 |

TABLE 18

Inducer Section - Secondary Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 1-43 | 0 | 0 | 0 | 0 | 0 | 0 | 0 | 0 | 0 | 0 | 0 | 0 |
| 44 | −0.0003 | −0.9000 | 1.0920 | 0.0042 | −0.9000 | 1.1109 | −0.0084 | −0.3981 | 1.0450 | 0.0099 | −0.3901 | 1.0795 |
| 45 | 0.1966 | −0.8783 | 1.0449 | 0.2017 | −0.8771 | 1.0665 | 0.0804 | −0.4020 | 0.9952 | 0.0986 | −0.3880 | 1.0347 |
| 46 | 0.3843 | −0.8138 | 0.9971 | 0.3897 | −0.8113 | 1.0213 | 0.1711 | −0.3864 | 0.9447 | 0.1870 | −0.3662 | 0.9890 |
| 47 | 0.5532 | −0.7099 | 0.9485 | 0.5585 | −0.7058 | 0.9753 | 0.2590 | −0.3507 | 0.8933 | 0.2710 | −0.3248 | 0.9426 |
| 48 | 0.6950 | −0.5718 | 0.8991 | 0.6997 | −0.5660 | 0.9287 | 0.3390 | −0.2948 | 0.8410 | 0.3461 | −0.2647 | 0.8955 |
| 49 | 0.8028 | −0.4069 | 0.8490 | 0.8065 | −0.3994 | 0.8812 | 0.4060 | −0.2205 | 0.7878 | 0.4070 | −0.1873 | 0.8476 |
| 50 | 0.8718 | −0.2236 | 0.7981 | 0.8740 | −0.2146 | 0.8330 | 0.4556 | −0.1314 | 0.7339 | 0.4497 | −0.0963 | 0.7989 |
| 51 | 0.8995 | −0.0312 | 0.7464 | 0.8998 | −0.0210 | 0.7840 | 0.4846 | −0.0319 | 0.6792 | 0.4712 | 0.0036 | 0.7494 |
| 52 | 0.8855 | 0.1611 | 0.6954 | 0.8835 | 0.1714 | 0.7330 | 0.4904 | 0.0740 | 0.6263 | 0.4708 | 0.1061 | 0.6966 |
| 53 | 0.8317 | 0.3440 | 0.6436 | 0.8275 | 0.3539 | 0.6811 | 0.4728 | 0.1794 | 0.5726 | 0.4476 | 0.2073 | 0.6430 |

TABLE 19

Impeller Section - Main Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 1 | 0.9585 | 0.0192 | 0.4740 | 0.9451 | 0.0224 | 0.4885 | 0.7425 | 0.0029 | 0.2149 | 0.7587 | −0.0030 | 0.2049 |
| 2 | 0.9511 | 0.2962 | 0.4426 | 0.9336 | 0.2958 | 0.4573 | 0.7646 | 0.2760 | 0.1805 | 0.7855 | 0.2756 | 0.1712 |
| 3 | 0.8866 | 0.5444 | 0.4116 | 0.8662 | 0.5391 | 0.4263 | 0.7200 | 0.5102 | 0.1530 | 0.7436 | 0.5159 | 0.1444 |
| 4 | 0.7838 | 0.7561 | 0.3824 | 0.7616 | 0.7453 | 0.3970 | 0.6373 | 0.7049 | 0.1306 | 0.6622 | 0.7165 | 0.1225 |
| 5 | 0.6601 | 0.9293 | 0.3559 | 0.6372 | 0.9130 | 0.3702 | 0.5350 | 0.8633 | 0.1120 | 0.5603 | 0.8805 | 0.1043 |
| 6 | 0.5289 | 1.0675 | 0.3322 | 0.5059 | 1.0460 | 0.3462 | 0.4249 | 0.9909 | 0.0964 | 0.4500 | 1.0132 | 0.0890 |
| 7 | 0.3988 | 1.1765 | 0.3113 | 0.3762 | 1.1501 | 0.3250 | 0.3143 | 1.0932 | 0.0832 | 0.3390 | 1.1202 | 0.0761 |
| 8 | 0.2749 | 1.2622 | 0.2930 | 0.2529 | 1.2312 | 0.3064 | 0.2074 | 1.1753 | 0.0720 | 0.2315 | 1.2067 | 0.0652 |
| 9 | 0.1597 | 1.3300 | 0.2770 | 0.1383 | 1.2948 | 0.2900 | 0.1064 | 1.2417 | 0.0625 | 0.1299 | 1.2771 | 0.0559 |
| 10 | 0.0540 | 1.3842 | 0.2630 | 0.0332 | 1.3450 | 0.2757 | 0.0123 | 1.2957 | 0.0543 | 0.0353 | 1.3349 | 0.0480 |
| 11 | −0.0421 | 1.4281 | 0.2508 | −0.0624 | 1.3853 | 0.2631 | −0.0747 | 1.3401 | 0.0472 | −0.0521 | 1.3829 | 0.0412 |
| 12 | −0.1292 | 1.4642 | 0.2401 | −0.1492 | 1.4179 | 0.2521 | −0.1548 | 1.3771 | 0.0412 | −0.1324 | 1.4232 | 0.0353 |
| 13 | −0.2080 | 1.4946 | 0.2308 | −0.2279 | 1.4450 | 0.2423 | −0.2283 | 1.4082 | 0.0359 | −0.2060 | 1.4577 | 0.0303 |
| 14 | −0.2793 | 1.5206 | 0.2225 | −0.2993 | 1.4677 | 0.2338 | −0.2957 | 1.4349 | 0.0313 | −0.2735 | 1.4875 | 0.0260 |
| 15 | −0.3439 | 1.5432 | 0.2153 | −0.3641 | 1.4872 | 0.2261 | −0.3577 | 1.4579 | 0.0273 | −0.3352 | 1.5136 | 0.0222 |
| 16 | −0.4025 | 1.5633 | 0.2089 | −0.4232 | 1.5043 | 0.2194 | −0.4147 | 1.4782 | 0.0238 | −0.3919 | 1.5368 | 0.0189 |
| 17 | −0.4558 | 1.5814 | 0.2032 | −0.4771 | 1.5194 | 0.2134 | −0.4673 | 1.4961 | 0.0208 | −0.4440 | 1.5576 | 0.0161 |

TABLE 19-continued

Impeller Section - Main Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 18 | −0.5044 | 1.5979 | 0.1982 | −0.5266 | 1.5331 | 0.2080 | −0.5159 | 1.5123 | 0.0181 | −0.4919 | 1.5766 | 0.0137 |
| 19 | −0.5489 | 1.6132 | 0.1937 | −0.5721 | 1.5456 | 0.2031 | −0.5609 | 1.5270 | 0.0157 | −0.5362 | 1.5940 | 0.0115 |
| 20 | −0.5897 | 1.6276 | 0.1897 | −0.6141 | 1.5572 | 0.1987 | −0.6028 | 1.5405 | 0.0136 | −0.5771 | 1.6102 | 0.0097 |
| 21 | −0.6280 | 1.6398 | 0.1863 | −0.6523 | 1.5694 | 0.1947 | −0.6413 | 1.5543 | 0.0117 | −0.6155 | 1.6241 | 0.0081 |
| 22 | −0.6637 | 1.6513 | 0.1832 | −0.6881 | 1.5809 | 0.1910 | −0.6773 | 1.5674 | 0.0100 | −0.6513 | 1.6371 | 0.0068 |
| 23 | −0.6970 | 1.6622 | 0.1804 | −0.7217 | 1.5917 | 0.1876 | −0.7109 | 1.5797 | 0.0085 | −0.6849 | 1.6494 | 0.0056 |
| 24 | −0.7283 | 1.6725 | 0.1779 | −0.7533 | 1.6022 | 0.1846 | −0.7426 | 1.5914 | 0.0072 | −0.7164 | 1.6610 | 0.0046 |
| 25 | −0.7576 | 1.6825 | 0.1756 | −0.7831 | 1.6122 | 0.1818 | −0.7726 | 1.6026 | 0.0060 | −0.7461 | 1.6721 | 0.0037 |
| 26 | −0.7853 | 1.6920 | 0.1735 | −0.8112 | 1.6218 | 0.1793 | −0.8010 | 1.6133 | 0.0050 | −0.7743 | 1.6828 | 0.0029 |
| 27 | −0.8115 | 1.7013 | 0.1717 | −0.8378 | 1.6312 | 0.1770 | −0.8280 | 1.6236 | 0.0041 | −0.8011 | 1.6930 | 0.0022 |
| 28 | −0.8364 | 1.7102 | 0.1699 | −0.8631 | 1.6403 | 0.1749 | −0.8537 | 1.6335 | 0.0033 | −0.8266 | 1.7028 | 0.0017 |
| 29 | −0.8601 | 1.7190 | 0.1684 | −0.8872 | 1.6492 | 0.1730 | −0.8784 | 1.6431 | 0.0027 | −0.8510 | 1.7123 | 0.0012 |
| 30 | −0.8827 | 1.7275 | 0.1670 | −0.9103 | 1.6579 | 0.1712 | −0.9020 | 1.6524 | 0.0021 | −0.8744 | 1.7215 | 0.0008 |
| 31 | −0.9044 | 1.7359 | 0.1657 | −0.9324 | 1.6664 | 0.1696 | −0.9247 | 1.6615 | 0.0016 | −0.8969 | 1.7305 | 0.0005 |
| 32 | −0.9252 | 1.7441 | 0.1645 | −0.9537 | 1.6748 | 0.1681 | −0.9467 | 1.6703 | 0.0011 | −0.9185 | 1.7393 | 0.0003 |
| 33 | −0.9454 | 1.7522 | 0.1634 | −0.9742 | 1.6830 | 0.1668 | −0.9679 | 1.6790 | 0.0009 | −0.9395 | 1.7478 | −0.0009 |
| 34 | −0.9649 | 1.7601 | 0.1625 | −0.9940 | 1.6911 | 0.1655 | −0.9884 | 1.6875 | 0.0000 | −0.9598 | 1.7562 | 0.0000 |
| 35 | −0.9838 | 1.7680 | 0.1616 | −1.0133 | 1.6991 | 0.1644 | −1.0084 | 1.6958 | 0.0000 | −0.9796 | 1.7644 | 0.0000 |
| 36 | −1.0023 | 1.7757 | 0.1608 | −1.0320 | 1.7069 | 0.1633 | −1.0279 | 1.7040 | 0.0000 | −0.9988 | 1.7725 | 0.0000 |
| 37 | −1.0203 | 1.7834 | 0.1600 | −1.0502 | 1.7147 | 0.1624 | −1.0469 | 1.7120 | 0.0000 | −1.0176 | 1.7805 | 0.0000 |
| 38 | −1.0380 | 1.7910 | 0.1594 | −1.0681 | 1.7223 | 0.1615 | −1.0656 | 1.7200 | 0.0000 | −1.0361 | 1.7884 | 0.0000 |
| 39 | −1.0555 | 1.7985 | 0.1588 | −1.0857 | 1.7299 | 0.1607 | −1.0837 | 1.7279 | 0.0000 | −1.0541 | 1.7962 | 0.0000 |
| 40 | −1.3324 | 1.9180 | 0.1588 | −1.3576 | 1.8472 | 0.1607 | −1.3559 | 1.8449 | 0.0000 | −1.3312 | 1.9154 | 0.0000 |

TABLE 20

Impeller Section - Primary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 1-4 | 0 | 0 | 0 | 0 | 0 | 0 | 0 | 0 | 0 | 0 | 0 | 0 |
| 5 | −0.0138 | 1.1350 | 0.3585 | −0.0195 | 1.1181 | 0.3676 | −0.0728 | 1.0182 | 0.1106 | −0.0662 | 1.0364 | 0.1057 |
| 6 | −0.2007 | 1.1690 | 0.3347 | −0.2045 | 1.1492 | 0.3437 | −0.2374 | 1.0573 | 0.0951 | −0.2328 | 1.0784 | 0.0903 |
| 7 | −0.3694 | 1.1801 | 0.3137 | −0.3711 | 1.1577 | 0.3226 | −0.3876 | 1.0755 | 0.0820 | −0.3850 | 1.0991 | 0.0774 |
| 8 | −0.5194 | 1.1762 | 0.2953 | −0.5192 | 1.1513 | 0.3040 | −0.5230 | 1.0796 | 0.0708 | −0.5222 | 1.1055 | 0.0664 |
| 9 | −0.6520 | 1.1629 | 0.2792 | −0.6497 | 1.1358 | 0.2878 | −0.6442 | 1.0743 | 0.0614 | −0.6453 | 1.1023 | 0.0570 |
| 10 | −0.7689 | 1.1442 | 0.2651 | −0.7648 | 1.1151 | 0.2735 | −0.7525 | 1.0630 | 0.0532 | −0.7554 | 1.0930 | 0.0490 |
| 11 | −0.8720 | 1.1228 | 0.2528 | −0.8662 | 1.0917 | 0.2610 | −0.8494 | 1.0481 | 0.0462 | −0.8539 | 1.0801 | 0.0422 |
| 12 | −0.9634 | 1.1006 | 0.2421 | −0.9560 | 1.0675 | 0.2501 | −0.9363 | 1.0313 | 0.0402 | −0.9423 | 1.0653 | 0.0363 |
| 13 | −1.0447 | 1.0785 | 0.2326 | −1.0359 | 1.0435 | 0.2405 | −1.0137 | 1.0137 | 0.0350 | −1.0218 | 1.0495 | 0.0312 |
| 14 | −1.1174 | 1.0573 | 0.2243 | −1.1072 | 1.0203 | 0.2319 | −1.0849 | 0.9959 | 0.0305 | −1.0935 | 1.0336 | 0.0268 |
| 15 | −1.1827 | 1.0373 | 0.2170 | −1.1714 | 0.9984 | 0.2244 | −1.1488 | 0.9784 | 0.0265 | −1.1586 | 1.0181 | 0.0230 |
| 16 | −1.2417 | 1.0187 | 0.2106 | −1.2294 | 0.9778 | 0.2177 | −1.2071 | 0.9616 | 0.0231 | −1.2179 | 1.0032 | 0.0197 |
| 17 | −1.2953 | 1.0016 | 0.2048 | −1.2822 | 0.9587 | 0.2118 | −1.2604 | 0.9456 | 0.0200 | −1.2721 | 0.9891 | 0.0169 |
| 18 | −1.3442 | 0.9860 | 0.1997 | −1.3304 | 0.9411 | 0.2064 | −1.3093 | 0.9304 | 0.0174 | −1.3219 | 0.9759 | 0.0144 |
| 19 | −1.3891 | 0.9719 | 0.1952 | −1.3747 | 0.9248 | 0.2016 | −1.3546 | 0.9162 | 0.0151 | −1.3678 | 0.9637 | 0.0122 |
| 20 | −1.4305 | 0.9591 | 0.1911 | −1.4156 | 0.9099 | 0.1973 | −1.3965 | 0.9029 | 0.0130 | −1.4104 | 0.9524 | 0.0103 |
| 21 | −1.4689 | 0.9475 | 0.1874 | −1.4533 | 0.8964 | 0.1935 | −1.4355 | 0.8904 | 0.0112 | −1.4499 | 0.9420 | 0.0086 |
| 22 | −1.5049 | 0.9368 | 0.1842 | −1.4887 | 0.8836 | 0.1900 | −1.4719 | 0.8789 | 0.0096 | −1.4868 | 0.9325 | 0.0072 |
| 23 | −1.5386 | 0.9270 | 0.1812 | −1.5220 | 0.8716 | 0.1868 | −1.5061 | 0.8681 | 0.0082 | −1.5214 | 0.9237 | 0.0059 |
| 24 | −1.5703 | 0.9180 | 0.1785 | −1.5533 | 0.8605 | 0.1839 | −1.5383 | 0.8579 | 0.0069 | −1.5541 | 0.9156 | 0.0048 |
| 25 | −1.6002 | 0.9098 | 0.1761 | −1.5829 | 0.8501 | 0.1813 | −1.5688 | 0.8484 | 0.0058 | −1.5849 | 0.9081 | 0.0039 |
| 26 | −1.6285 | 0.9022 | 0.1739 | −1.6110 | 0.8404 | 0.1789 | −1.5977 | 0.8393 | 0.0049 | −1.6143 | 0.9012 | 0.0030 |
| 27 | −1.6554 | 0.8953 | 0.1720 | −1.6378 | 0.8313 | 0.1767 | −1.6253 | 0.8308 | 0.0040 | −1.6422 | 0.8947 | 0.0024 |
| 28 | −1.6811 | 0.8890 | 0.1702 | −1.6633 | 0.8228 | 0.1747 | −1.6517 | 0.8227 | 0.0033 | −1.6689 | 0.8887 | 0.0018 |
| 29 | −1.7057 | 0.8831 | 0.1685 | −1.6877 | 0.8148 | 0.1728 | −1.6770 | 0.8150 | 0.0026 | −1.6945 | 0.8830 | 0.0013 |
| 30 | −1.7293 | 0.8778 | 0.1670 | −1.7112 | 0.8073 | 0.1712 | −1.7013 | 0.8076 | 0.0020 | −1.7190 | 0.8778 | 0.0009 |
| 31 | −1.7520 | 0.8728 | 0.1657 | −1.7338 | 0.8001 | 0.1696 | −1.7247 | 0.8006 | 0.0016 | −1.7427 | 0.8729 | 0.0005 |
| 32 | −1.7737 | 0.8672 | 0.1645 | −1.7560 | 0.7944 | 0.1681 | −1.7477 | 0.7949 | 0.0011 | −1.7654 | 0.8672 | 0.0003 |
| 33 | −1.7947 | 0.8619 | 0.1634 | −1.7774 | 0.7890 | 0.1668 | −1.7699 | 0.7894 | 0.0009 | −1.7874 | 0.8618 | −0.0009 |
| 34 | −1.8152 | 0.8568 | 0.1625 | −1.7982 | 0.7839 | 0.1655 | −1.7915 | 0.7842 | 0.0000 | −1.8088 | 0.8566 | 0.0000 |
| 35 | −1.8351 | 0.8521 | 0.1616 | −1.8184 | 0.7790 | 0.1644 | −1.8126 | 0.7792 | 0.0000 | −1.8296 | 0.8517 | 0.0000 |
| 36 | −1.8546 | 0.8475 | 0.1608 | −1.8382 | 0.7743 | 0.1633 | −1.8332 | 0.7744 | 0.0000 | −1.8499 | 0.8469 | 0.0000 |
| 37 | −1.8737 | 0.8431 | 0.1600 | −1.8575 | 0.7699 | 0.1624 | −1.8533 | 0.7697 | 0.0000 | −1.8698 | 0.8423 | 0.0000 |
| 38 | −1.8925 | 0.8388 | 0.1594 | −1.8764 | 0.7656 | 0.1615 | −1.8731 | 0.7652 | 0.0000 | −1.8894 | 0.8379 | 0.0000 |

TABLE 20-continued

Impeller Section - Primary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 39 | −1.9111 | 0.8346 | 0.1588 | −1.8952 | 0.7614 | 0.1607 | −1.8924 | 0.7609 | 0.0000 | −1.9085 | 0.8336 | 0.0000 |
| 40 | −2.2053 | 0.7685 | 0.1588 | −2.1840 | 0.6965 | 0.1607 | −2.1814 | 0.6956 | 0.0000 | −2.2029 | 0.7672 | 0.0000 |

TABLE 21

Impeller Section - Secondary Splitter Blades

| Cross-section Number | Vertex 76 (shroud pressure side) | | | Vertex 78 (shroud suction side) | | | Vertex 80 (hub suction side) | | | Vertex 82 (hub pressure side) | | |
|---|---|---|---|---|---|---|---|---|---|---|---|---|
| | x [in] | y [in] | z [in] | x [in] | y [in] | z [in] | x [in] | y [in] | z [in] | x [in] | y [in] | z [in] |
| 1-11 | 0 | 0 | 0 | 0 | 0 | 0 | 0 | 0 | 0 | 0 | 0 | 0 |
| 12 | −0.5768 | 1.3373 | 0.2438 | −0.5787 | 1.3179 | 0.2484 | −0.5708 | 1.2774 | 0.0394 | −0.5680 | 1.2970 | 0.0371 |
| 13 | −0.6608 | 1.3415 | 0.2342 | −0.6622 | 1.3196 | 0.2389 | −0.6508 | 1.2846 | 0.0342 | −0.6483 | 1.3068 | 0.0319 |
| 14 | −0.7363 | 1.3439 | 0.2257 | −0.7374 | 1.3194 | 0.2306 | −0.7235 | 1.2893 | 0.0298 | −0.7213 | 1.3140 | 0.0275 |
| 15 | −0.8045 | 1.3453 | 0.2182 | −0.8054 | 1.3182 | 0.2232 | −0.7899 | 1.2923 | 0.0259 | −0.7879 | 1.3195 | 0.0236 |
| 16 | −0.8663 | 1.3460 | 0.2117 | −0.8670 | 1.3164 | 0.2166 | −0.8505 | 1.2941 | 0.0226 | −0.8487 | 1.3239 | 0.0202 |
| 17 | −0.9225 | 1.3465 | 0.2058 | −0.9231 | 1.3144 | 0.2108 | −0.9063 | 1.2951 | 0.0196 | −0.9046 | 1.3274 | 0.0173 |
| 18 | −0.9738 | 1.3470 | 0.2006 | −0.9744 | 1.3123 | 0.2055 | −0.9576 | 1.2957 | 0.0170 | −0.9560 | 1.3305 | 0.0148 |
| 19 | −1.0209 | 1.3476 | 0.1960 | −1.0215 | 1.3104 | 0.2008 | −1.0050 | 1.2959 | 0.0147 | −1.0034 | 1.3332 | 0.0125 |
| 20 | −1.0642 | 1.3484 | 0.1918 | −1.0650 | 1.3087 | 0.1966 | −1.0490 | 1.2960 | 0.0127 | −1.0473 | 1.3357 | 0.0106 |
| 21 | −1.1043 | 1.3495 | 0.1881 | −1.1051 | 1.3073 | 0.1928 | −1.0895 | 1.2960 | 0.0109 | −1.0881 | 1.3383 | 0.0089 |
| 22 | −1.1418 | 1.3506 | 0.1847 | −1.1427 | 1.3059 | 0.1894 | −1.1282 | 1.2961 | 0.0094 | −1.1262 | 1.3408 | 0.0074 |
| 23 | −1.1769 | 1.3519 | 0.1817 | −1.1780 | 1.3046 | 0.1863 | −1.1640 | 1.2962 | 0.0080 | −1.1618 | 1.3434 | 0.0061 |
| 24 | −1.2099 | 1.3533 | 0.1790 | −1.2113 | 1.3035 | 0.1835 | −1.1978 | 1.2963 | 0.0068 | −1.1954 | 1.3460 | 0.0050 |
| 25 | −1.2409 | 1.3549 | 0.1765 | −1.2426 | 1.3026 | 0.1809 | −1.2297 | 1.2965 | 0.0057 | −1.2270 | 1.3486 | 0.0040 |
| 26 | −1.2702 | 1.3566 | 0.1743 | −1.2723 | 1.3018 | 0.1785 | −1.2600 | 1.2966 | 0.0047 | −1.2571 | 1.3512 | 0.0032 |
| 27 | −1.2980 | 1.3586 | 0.1723 | −1.3005 | 1.3013 | 0.1764 | −1.2889 | 1.2968 | 0.0039 | −1.2856 | 1.3539 | 0.0025 |
| 28 | −1.3244 | 1.3607 | 0.1704 | −1.3274 | 1.3009 | 0.1744 | −1.3165 | 1.2971 | 0.0032 | −1.3129 | 1.3566 | 0.0019 |
| 29 | −1.3496 | 1.3629 | 0.1688 | −1.3531 | 1.3006 | 0.1726 | −1.3429 | 1.2974 | 0.0025 | −1.3390 | 1.3593 | 0.0013 |
| 30 | −1.3737 | 1.3653 | 0.1673 | −1.3778 | 1.3005 | 0.1709 | −1.3683 | 1.2977 | 0.0020 | −1.3640 | 1.3621 | 0.0009 |
| 31 | −1.3968 | 1.3678 | 0.1659 | −1.4015 | 1.3005 | 0.1694 | −1.3927 | 1.2981 | 0.0015 | −1.3880 | 1.3650 | 0.0006 |
| 32 | −1.4191 | 1.3704 | 0.1646 | −1.4244 | 1.3006 | 0.1680 | −1.4164 | 1.2985 | 0.0011 | −1.4113 | 1.3678 | 0.0003 |
| 33 | −1.4407 | 1.3731 | 0.1635 | −1.4465 | 1.3009 | 0.1667 | −1.4393 | 1.2989 | 0.0009 | −1.4337 | 1.3707 | −0.0009 |
| 34 | −1.4616 | 1.3758 | 0.1625 | −1.4679 | 1.3012 | 0.1655 | −1.4615 | 1.2994 | 0.0000 | −1.4555 | 1.3736 | 0.0000 |
| 35 | −1.4820 | 1.3774 | 0.1616 | −1.4887 | 1.3028 | 0.1644 | −1.4831 | 1.3012 | 0.0000 | −1.4769 | 1.3754 | 0.0000 |
| 36 | −1.5019 | 1.3791 | 0.1608 | −1.5089 | 1.3045 | 0.1633 | −1.5042 | 1.3029 | 0.0000 | −1.4977 | 1.3771 | 0.0000 |
| 37 | −1.5215 | 1.3808 | 0.1600 | −1.5287 | 1.3062 | 0.1624 | −1.5247 | 1.3047 | 0.0000 | −1.5180 | 1.3789 | 0.0000 |
| 38 | −1.5406 | 1.3826 | 0.1594 | −1.5480 | 1.3080 | 0.1615 | −1.5449 | 1.3066 | 0.0000 | −1.5380 | 1.3807 | 0.0000 |
| 39 | −1.5596 | 1.3843 | 0.1588 | −1.5672 | 1.3097 | 0.1607 | −1.5646 | 1.3084 | 0.0000 | −1.5575 | 1.3825 | 0.0000 |
| 40 | −1.8599 | 1.4124 | 0.1588 | −1.8619 | 1.3373 | 0.1607 | −1.8596 | 1.3357 | 0.0000 | −1.8580 | 1.4103 | 0.0000 |

Discussion of Possible Embodiments

A housing according to an exemplary embodiment of this disclosure, among other possible things, includes walls defining a volute passage. The volute passage includes a first subsection having cross-sectional areas defined by Table 6 and a second subsection having cross-sectional areas defined by Table 7.

The housing of the preceding paragraph can optionally include, additionally and/or alternatively, any one or more of the following features, configurations and/or additional components:

A further embodiment of the foregoing housing, wherein the walls define an exit bend fluidly connected to the diffuser passage, and wherein the exit bend has cross-sectional areas defined by Table 8.

A further embodiment of any of the foregoing housings, wherein the diffuser passage can have cross-sectional areas with continuously increasing area from an inlet to an outlet of the diffuser passage.

A further embodiment of any of the foregoing housings, wherein the housing can have a first half defining a first portion of the volute and diffuser passages and a second half defining a second portion of the volute and diffuser passages, and wherein the first and second halves can mate in a facing relationship such that the first and second portions cooperate to form the volute and diffuser passages.

A further embodiment of any of the foregoing housings, wherein the volute passage can be configured to fluidly communicate with a rotor having an outer diameter greater than or equal to 4.115 inches and less than or equal to 4.135 inches.

A centrifugal pump according to an exemplary embodiment of this disclosure, among other things, includes a rotor and a housing. The housing includes walls defining a volute passage. The volute passage includes a first subsection having cross-sectional areas defined by Table 6 and a second subsection having cross-sectional areas defined by Table 7.

The centrifugal pump of the preceding paragraph can optionally include, additionally and/or alternatively, any one or more of the following features, configurations and/or additional components:

A further embodiment of the foregoing centrifugal pump, wherein the walls can define an exit bend fluidly connected to the diffuser passage, and wherein the exit bend can have cross-sectional areas defined by Table 8.

A further embodiment of any of the foregoing centrifugal pumps, wherein the diffuser passage can have cross-sectional areas with continuously increasing area from an inlet to an outlet of the diffuser passage.

A further embodiment of any of the foregoing centrifugal pumps, wherein the housing can have a first half defining a first portion of the volute and diffuser passages and a second half defining a second portion of the volute and diffuser passages, and wherein the first and second halves can mate in a facing relationship such that the first and second portions cooperate to form the volute and diffuser passages.

A further embodiment of any of the foregoing centrifugal pumps, wherein the rotor can include an inducer having first and second pluralities of blades, each having a plurality of polygonal cross-sections defined by a plurality of vertices. The vertices of the first plurality of blades can be defined by Table 1, and the vertices of the second plurality of blades can be defined by Table 2. The z axis of the first and second pluralities of blades can be coincident with an axis of rotation of the rotor.

A further embodiment of any of the foregoing centrifugal pumps, wherein the rotor can include an impeller fluidly connected downstream of the inducer and having third, fourth, and fifth pluralities of blades, each having a plurality of polygonal cross-sections defined by a plurality of vertices. The vertices of the third plurality of blades can be defined by Table 4. The vertices of the fourth plurality of blades can be defined by Table 5. The vertices of the fifth plurality of blades can be defined by Table 5.

A further embodiment of any of the foregoing centrifugal pumps, wherein the volute passage can be configured to fluidly communicate with the rotor, and wherein the rotor can have an outer diameter greater than or equal to 4.115 inches and less than or equal to 4.135 inches.

A further embodiment of any of the foregoing centrifugal pumps, wherein the third, fourth, and fifth pluralities of blades can have a shroud.

A further embodiment of any of the foregoing centrifugal pumps, wherein the inducer and the impeller can be joined by a hub.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A housing comprising:
    walls defining a volute passage and a diffuser passage fluidly connected to the volute passage, wherein the volute passage has a first subsection having cross-sectional areas defined by Table 6 and a second subsection having cross-sectional areas defined by Table 7.

2. The housing of claim 1, wherein the walls define an exit bend fluidly connected to the diffuser passage, and wherein the exit bend has cross-sectional areas defined by Table 8.

3. The housing of claim 1, wherein the diffuser passage has cross-sectional areas with continuously increasing area from an inlet to an outlet of the diffuser passage.

4. The housing of claim 2, wherein the housing has a first half defining a first portion of the volute and diffuser passages and a second half defining a second portion of the volute and diffuser passages, and wherein the first and second halves mate in a facing relationship such that the first and second portions cooperate to form the volute and diffuser passages.

5. The housing of claim 4, wherein the volute passage is configured to fluidly communicate with a rotor having an outer diameter greater than or equal to 4.115 inches and less than or equal to 4.135 inches.

6. A centrifugal pump comprising:
    a rotor; and
    a housing comprising:
        walls defining a volute passage and a diffuser passage fluidly connected to the volute passage, wherein the volute passage has a first subsection having cross-sectional areas defined by Table 6 and a second subsection having cross-sectional areas defined by Table 7.

7. The centrifugal pump of claim 6, wherein the walls define an exit bend fluidly connected to the diffuser passage, and wherein the exit bend has cross-sectional areas defined by Table 8.

8. The centrifugal pump of claim 6, wherein the diffuser passage has cross-sectional areas with continuously increasing area from an inlet to an outlet of the diffuser passage.

9. The centrifugal pump of claim 7, wherein the housing has a first half defining a first portion of the volute and diffuser passages and a second half defining a second portion of the volute and diffuser passages, and wherein the first and second halves mate in a facing relationship such that the first and second portions cooperate to form the volute and diffuser passages.

10. The centrifugal pump of claim 6, the rotor further comprising:
    an inducer having first and second pluralities of blades, each having a plurality of polygonal cross-sections defined by a plurality of vertices, wherein the vertices of the first plurality of blades are defined by Table 1 and the vertices of the second plurality of blades are defined by Table 2, and wherein the z axis is coincident with an axis of rotation of the rotor.

11. The centrifugal pump of claim 10, the rotor further comprising:
    an impeller fluidly connected downstream of the inducer and having third, fourth, and fifth pluralities of blades, each having a plurality of polygonal cross-sections defined by a plurality of vertices, wherein the vertices of the third plurality of blades are defined by Table 3, the vertices of the fourth plurality of blades are defined by Table 4, and the vertices of the fifth plurality of blades are defined by Table 5.

12. The centrifugal pump of claim 11, wherein the volute passage is configured to fluidly communicate with the rotor, and wherein the rotor has an outer diameter greater than or equal to 4.115 inches and less than or equal to 4.135 inches.

13. The rotor of claim 11, wherein the third, fourth, and fifth pluralities of blades have a shroud.

14. The rotor of claim 11, wherein the inducer and the impeller are joined by a hub.

* * * * *